US011163581B2

United States Patent
Eyole et al.

(10) Patent No.: US 11,163,581 B2
(45) Date of Patent: Nov. 2, 2021

(54) ONLINE INSTRUCTION TAGGING

(71) Applicant: Arm Limited, Cambridge (GB)

(72) Inventors: Mbou Eyole, Soham (GB); Michiel Willem Van Tol, Cambridge (GB)

(73) Assignee: Arm Limited, Cambridge (GB)

( * ) Notice: Subject to any disclaimer, the term of this patent is extended or adjusted under 35 U.S.C. 154(b) by 45 days.

(21) Appl. No.: 16/658,490

(22) Filed: Oct. 21, 2019

(65) Prior Publication Data

US 2021/0117204 A1     Apr. 22, 2021

(51) Int. Cl.
*G06F 9/38* (2018.01)
*G06F 9/30* (2018.01)

(52) U.S. Cl.
CPC ........ *G06F 9/3855* (2013.01); *G06F 9/30098* (2013.01); *G06F 9/384* (2013.01)

(58) Field of Classification Search
None
See application file for complete search history.

(56) References Cited

U.S. PATENT DOCUMENTS

| | | | | |
|---|---|---|---|---|
| 5,887,161 | A * | 3/1999 | Cheong | G06F 9/3836 712/228 |
| 6,112,019 | A * | 8/2000 | Chamdani | G06F 9/3836 712/214 |
| 7,660,971 | B2 * | 2/2010 | Agarwal | G06F 9/3842 712/217 |
| 10,740,108 | B2 * | 8/2020 | Gschwind | G06F 9/3863 |

(Continued)

OTHER PUBLICATIONS

Ham et al., "Decoupling Data Supply from Computation for Latency-Tolerant Communication in Heterogeneous Architectures", *ACM Transactions on Architecture and Code Optimization*, vol. 14, No. 2, Article 16, 16, Jun. 2017, 27 pages.

(Continued)

*Primary Examiner* — Michael Sun
(74) *Attorney, Agent, or Firm* — Nixon & Vanderhye P.C.

(57) ABSTRACT

Apparatuses and methods of data processing are disclosed for tagging instructions on-line. Instruction tag storage stores information indicative of a tag applied to certain instruction identifiers. A data processing operation performed by the data processing circuitry in response to an executed instruction is dependent on whether there is a corresponding instruction tag identifier for the executed instruction in the instruction tag storage which has the instruction tag. Register writer storage is maintained, and an entry is created for each register writing instruction encountered which causes a result value to be written to a destination register, where the entry comprises an indication of the destination register and the register writing instruction. An instruction tagging queue buffers instruction identifiers and an instruction identifier is added to the queue for a predetermined type of instruction when it is encountered. Instruction tagging circuitry tags the instructions in the instruction tagging queue and determines one or more producer instructions which each produce at least one data value which is a source operand of a subject instruction and adds the one or more producer instructions to the instruction tagging queue. Data dependency graphs are thus elaborated and online tagging of such data dependency graphs is thus supported.

18 Claims, 30 Drawing Sheets

(56) References Cited

U.S. PATENT DOCUMENTS

| | | | |
|---|---|---|---|
| 2003/0126408 A1 | 7/2003 | Vajapeyam et al. | |
| 2004/0210743 A1* | 10/2004 | Burky .................. | G06F 9/3851 |
| | | | 712/218 |
| 2009/0063823 A1* | 3/2009 | Burky .................. | G06F 9/3855 |
| | | | 712/216 |
| 2010/0333098 A1* | 12/2010 | Jordan .................. | G06F 9/384 |
| | | | 718/103 |
| 2013/0086365 A1* | 4/2013 | Gschwind ........... | G06F 9/30072 |
| | | | 712/220 |
| 2017/0109172 A1 | 4/2017 | Sleiman et al. | |

OTHER PUBLICATIONS

Smith, "Decoupled Access / Execute Computer Architectures", *ISCA '82 Proceedings of the 9th annual symposium on Computer Architecture*, Apr. 26-29, 1982, pp. 112-119.

Carlson et al., "The Load Slice Core Microarchitecture", *ISCA '15*, Jun. 13-17, 2015, 13 pages.

International Search Report and Written Opinion of the International Searching Authority for PCT/GB2020/052481 dated Feb. 3, 2021, 18 pages.

K. Koukos et al, "Towards More Efficient Execution: A Decoupled Access-Execute Approach", Proceedings of the 27th International ACM Conference on Supercomputing, *ICS'13*, Jun. 10-14, 2013, pp. 253-262.

W.W. Ro et al, "Design and evaluation of a hierarchical decoupled architecture" The Journal of Supercomputing, vol. 38, No. 3, pp. 237-259.

* cited by examiner

| TRAVERSAL TABLE | |
|---|---|
| INSTRUCTION | PRODUCERS |
| I3 | I2 |
| I5 | I3 |
| I9 | I5 |
| I10 | I7,I9 |
| | |

FIG. 13A

| LAST - WRITER TABLE | |
|---|---|
| PHYSICAL REGISTER | INSTRUCTION |
| ⋮ | ⋮ |
| 25 | - |
| 26 | I5 |
| 27 | - |
| 28 | I9 |
| ⋮ | ⋮ |

FIG. 13B

| INSTRUCTION TAG STORAGE | | |
|---|---|---|
| INSTRUCTION | TAG | N/P |
| . | . | . |
| . | . | . |
| . | . | . |
| I10 | A | 1 |
| . | . | . |
| . | . | . |
| . | . | . |
| I2 | A | 1 |
| . | . | . |
| . | . | . |
| . | . | . |
| I20 | - | 1 |
| . | . | . |
| . | . | . |
| . | . | . |

INSTRUCTION IDENTIFIER MAPPED TO CACHE POSITION

| A / E CACHE | |
|---|---|
| ACCESS BIT | N / P BIT |
|  |  |
| 1 |  |
|  | 1 |
|  |  |
| 1 | 1 |
|  |  |
|  |  |
|  |  |
|  |  |
| . | . |
| . | . |
| . | . |

ONLINE INSTRUCTION TAGGING

TECHNICAL FIELD

The present disclosure relates to data processing. In particular, the present disclosure relates to tagged instructions wherein a data processing operation performed in response to an instruction in dependent on whether it has an associated instruction tag or not.

DESCRIPTION

A data processing apparatus may be arranged to respond differently to a given instruction which it receives, dependent on whether the instruction has been marked or tagged in a particular way. This tagging of an instruction can be used in a variety of ways to modify the data processing operation which the apparatus performs in response. Indeed such tagging may be used to invoke the use of different parts of the data processing apparatus in response to the instruction, dependent on whether the instruction has been tagged or not. This provides a useful variety of flexibility in control over the data processing apparatus, since it may for example give the programmer the ability to modify the behaviour of the data processing apparatus without resorting to the use of an entirely new instruction. However, contexts may arise in which it is useful for this tagging of instructions to be made use of, but where those required tags are not a priori present in association with the instructions which the data processing apparatus receives. It may be possible to some extent for the data processing apparatus itself to associate a tag with a certain type of instruction, but when the definition grows more complex of which instructions should be tagged, this task becomes notably more complex than simply applying the tag to a particular type of instruction.

SUMMARY

In at least one example embodiment described herein there is an apparatus comprising: data processing circuitry responsive to received instructions to perform data processing operations; instruction tag storage to store entries comprising instruction identifiers, wherein an instruction tag is selectively stored in association with each instruction identifier, and wherein a data processing operation performed by the data processing circuitry in response to an executed instruction is dependent on whether there is a corresponding instruction identifier for the executed instruction in the instruction tag storage which has the instruction tag; register writer storage; register mapping circuitry arranged to create an entry in the register writer storage for each register writing instruction in the received instructions which causes a result value to be written to a destination register, wherein the entry comprises an indication of the destination register and a register writing instruction identifier; an instruction tagging queue to buffer instruction identifiers, wherein the register mapping circuitry is responsive to encountering an instruction instance of a predetermined type of instruction in the received instructions to add to the instruction tagging queue an instruction identifier for the instruction instance of the predetermined type of instruction; and instruction tagging circuitry to receive from the instruction tagging queue the instruction identifiers and for each instruction identifier to perform tag processing comprising: creating an entry in the instruction tag storage and storing the instruction tag in association therewith; and for a subject instruction identified by the instruction identifier determining one or more producer instructions which each produce at least one data value which is a source operand of the subject instruction and adding the one or more producer instructions to the instruction tagging queue.

In at least one other example embodiment described herein there is a method of operating an apparatus, the method comprising: performing data processing operations in response to received instructions; storing entries in an instruction tag storage comprising instruction identifiers, wherein an instruction tag is selectively stored in association with each instruction identifier, and wherein a data processing operation performed in response to an executed instruction is dependent on whether there is a corresponding instruction identifier for the executed instruction in the instruction tag storage which has the instruction tag; creating an entry in a register writer storage for each register writing instruction in the received instructions which causes a result value to be written to a destination register, wherein the entry comprises an indication of the destination register and a register writing instruction identifier; buffering instruction identifiers in an instruction tagging queue, wherein in response to encountering an instruction instance of a predetermined type of instruction in the received instructions an instruction identifier is added to the instruction tagging queue for the instruction instance of the predetermined type of instruction; and receiving from the instruction tagging queue the instruction identifiers and for each instruction identifier performing tag processing comprising: creating an entry in the instruction tag storage and storing the instruction tag in association therewith; and for a subject instruction identified by the instruction identifier determining one or more producer instructions which each produce at least one data value which is a source operand of the subject instruction and adding the one or more producer instructions to the instruction tagging queue.

In at least one further example embodiment described herein there is an apparatus comprising: means for performing data processing operations in response to received instructions; means for storing instruction tag entries comprising instruction identifiers, wherein an instruction tag is selectively stored in association with each instruction identifier, and wherein a data processing operation performed by the means for performing data processing operations in response to an executed instruction is dependent on whether there is a corresponding instruction identifier for the executed instruction in the means for storing instruction tag entries which has the instruction tag; means for storing register writer information; means for creating an entry in the means for storing register writer information for each register writing instruction in the received instructions which causes a result value to be written to a destination register, wherein the entry comprises an indication of the destination register and a register writing instruction identifier; means for queuing instruction identifiers for instruction tagging, wherein in response to encountering an instruction instance of a predetermined type of instruction in the received instructions an instruction identifier is added to the means for queuing instruction identifiers for instruction tagging for the instruction instance of the predetermined type of instruction; and means for receiving from the means for queuing instruction identifiers for instruction tagging the instruction identifiers and means for performing, for each instruction identifier, tag processing, the means for performing tag processing comprising: means for creating an entry in the means for storing instruction tag entries and for storing the instruction tag in association therewith; means for determining, for a subject instruction identified by the instruction identifier, one or more producer instructions which each produce at least one data value which is a source operand of the subject instruction; and means for adding the one or more producer instructions to the means for queuing instruction identifiers for instruction tagging.

BRIEF DESCRIPTION OF THE DRAWINGS

The present invention will be described further, by way of example only, with reference to embodiments thereof as illustrated in the accompanying drawings, in which:

FIG. 8A is an "access" data dependency graph and FIG. 8B is an "execute" data dependency graph;

FIG. 13A illustrates example content of a traversal table in accordance with some embodiments;

FIG. 13B shows example content of a last-writer table in accordance with some embodiments;

DESCRIPTION OF EXAMPLE EMBODIMENTS

Figure 1A:
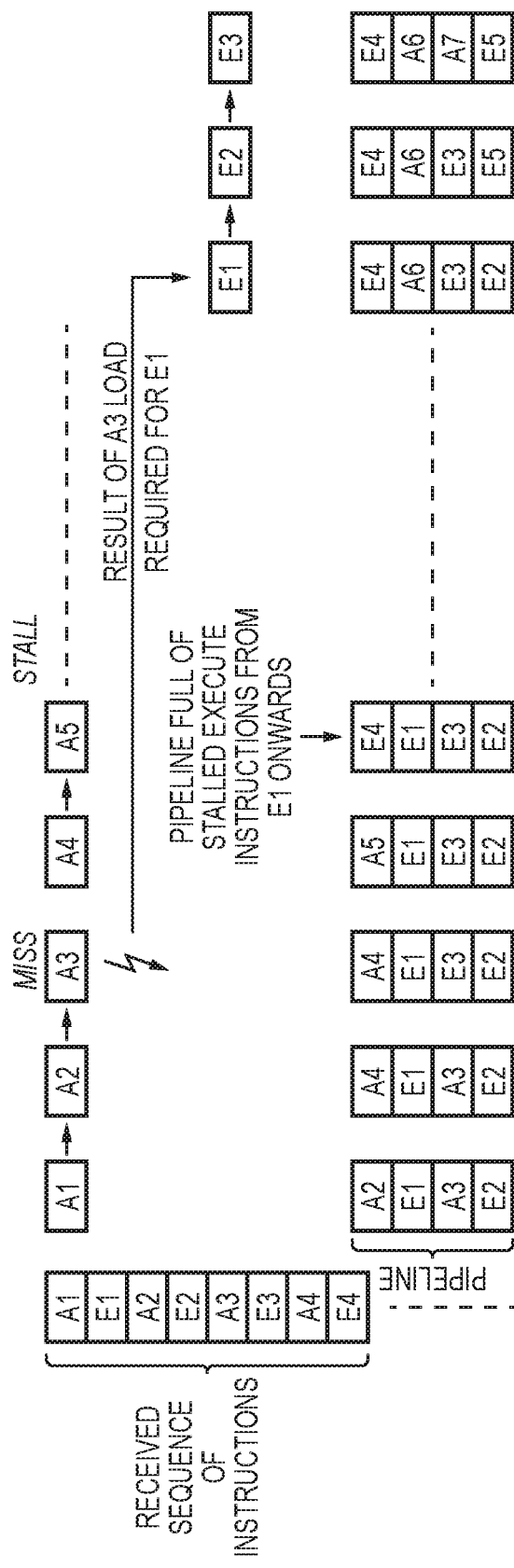
FIG. 1A illustrates a sequence of instructions comprising both access and execute instructions being received by a prior art processor, in a situation where a cache miss for an access instruction causes some subsequent execute instructions to stall the pipeline

Before discussing the embodiments with reference to the accompanying figures, the following description of embodiments is provided.

In accordance with one example there is provided an apparatus comprising: data processing circuitry responsive to received instructions to perform data processing operations; instruction tag storage to store entries comprising instruction identifiers, wherein an instruction tag is selectively stored in association with each instruction identifier, and wherein a data processing operation performed by the data processing circuitry in response to an executed instruction is dependent on whether there is a corresponding instruction identifier for the executed instruction in the instruction tag storage which has the instruction tag; register writer storage; register mapping circuitry arranged to create an entry in the register writer storage for each register writing instruction in the received instructions which causes a result value to be written to a destination register, wherein the entry comprises an indication of the destination register and a register writing instruction identifier; an instruction tagging queue to buffer instruction identifiers, wherein the register mapping circuitry is responsive to encountering an instruction instance of a predetermined type of instruction in the received instructions to add to the instruction tagging queue an instruction identifier for the instruction instance of the predetermined type of instruction; and instruction tagging circuitry to receive from the instruction tagging queue the instruction identifiers and for each instruction identifier to perform tag processing comprising: creating an entry in the instruction tag storage and storing the instruction tag in association therewith; and for a subject instruction identified by the instruction identifier determining one or more producer instructions which each produce at least one data value which is a source operand of the subject instruction and adding the one or more producer instructions to the instruction tagging queue.

Accordingly the apparatus of the present techniques is provided in context of instruction tagging, wherein certain dependencies between instructions mean that when a particular type of instruction (the "predetermined type of instruction") is to have the instruction tag associated with it, there exists the possibility for one or more other instructions in a dependency chain or graph linked to that instruction to also require the instruction tag. Here this dependency between instructions exists when a "producer" instruction produces at least one data value which is a source operand of another instruction. When that other instruction is the predetermined type of instruction (which per se should have the tag associated with it) then according to this paradigm the one or more producer instructions should also have instruction tag associated with them. Moreover, such a link between instructions can exist over multiple steps, generating chains or graphs of instructions which each should have the instruction tag associated with them, by virtue of the fact that they ultimately lead, via such dependencies, to an instance of the predetermined type of instruction.

The apparatus is provided with the capability to determine which instructions should have the instruction tag associated with them. Moreover, it is to be noted that this is an "online" technique, which the apparatus performs on-the-fly internally as its regular data processing operations are being carried out. The performance of those data processing operations can then be modified in dependence on whether the instructions it executes have the instruction tag or not.

The apparatus is provided with register write storage in which register mapping circuitry records an association between instructions and their destination registers (i.e. the register to which an instruction causes a result value to be written). Further, the apparatus has instruction tagging circuitry, which is arranged to identify producer instructions for a subject instruction, i.e. those instructions which generate data values which are the source operands for the subject instructions. The instruction tagging circuitry is then capable of determining the above-mentioned data dependencies, by virtue of the fact that when it identifies a producer instruction, that producer instruction is added to a queue of instructions which the instruction tagging circuitry processes. A processing loop is therefore established, according to which each iteration around the loop enables a further step in a data dependency graph to be determined. Each instruction thus identified has the instruction tag associated with it, as stored in the instruction tag storage, and thus starting from an instance of the predetermined type of instruction the data dependency graph linking to that predetermined type of instruction can be established by the apparatus, labelling each instruction belonging to that graph with the instruction tag as it goes.

In some embodiments the instruction tagging circuitry is arranged to determine the one or more producer instructions for the subject instruction identified by the instruction identifier with reference to the register writer storage. The entries in the register writer storage, namely comprising a destination register indication and a register writing instruction identifier, may be used by the instruction tagging circuitry in order to identify producer instructions, by comparison of the registers which the subject instruction specifies as source operands and determining from the register writer storage which instructions are recorded there as writing to those registers.

Nevertheless, the apparatus may also be provided with further structures in order to facilitate a determination of the producer instructions and in some embodiments the apparatus comprises linked instruction storage to store entries, each entry comprising identifiers of an entry instruction and of one or more producer instructions, wherein the one or more producer instructions each produce at least one data value which is a source operand of the entry instruction, and wherein the instruction tagging circuitry is arranged to determine the one or more producer instructions for the subject instruction identified by the instruction identifier with reference to the linked instruction storage. This structure therefore enables the apparatus to maintain information about the links between instructions, in particular the links between an instruction and its one or more producer instructions. The maintenance of this structure enables the instruction tagging circuitry to readily determine the producer instructions for a given subject instruction by reference to the linked instruction storage.

The present techniques may find applicability in a data processing apparatus which performs either in-order or out-of-order instruction execution, but in some embodiments the data processing circuitry is arranged to perform out-of-order instruction execution in response to the received instructions and the register mapping circuitry is arranged to perform register renaming comprising mapping architectural registers specified in the received instructions to physical registers, and wherein the entries in the register writer storage comprises indications of destination physical registers and register writing instruction identifiers. Register renaming is a known technique in the context of an out-of-order processor, and in such a context the present techniques provide that the register writer storage associates destination physical registers mapped to by the register mapping circuitry with the register writing instruction identifiers. This therefore supports the tracking of instructions which modify each physical register of the apparatus, and this can form the basis of identification of producer instructions which write to a given physical register, when that physical register is specified (as renamed) by an instruction as a source operand.

In some embodiments the apparatus further comprises linked instruction storage to store entries, each entry comprising identifiers of an entry instruction and of one or more producer instructions, wherein the one or more producer instructions each produce at least one data value which is a source operand of the entry instruction, wherein the instruction tagging circuitry is arranged to determine the one or more producer instructions for the subject instruction identified by the instruction identifier with reference to the linked instruction storage, wherein the data processing circuitry is arranged to perform out-of-order instruction execution in response to the received instructions and the register mapping circuitry is arranged to perform register renaming comprising mapping architectural registers specified in the received instructions to physical registers, wherein the entries in the register writer storage comprises indications of destination physical registers and register writing instruction identifiers, and wherein, when the register mapping circuitry performs register renaming with respect to source operands of an instruction, the register mapping circuitry is arranged to use content of the register writer storage to create an entry in the linked instruction storage. Accordingly, the provision of the linked instruction storage provides a useful set of derived information from the register writer storage, facilitating the determination by the instruction tagging circuitry of any producer instructions for an instruction which it processes for tagging.

As mentioned above, the present techniques may find applicability in an in-order processor and accordingly in some embodiments the data processing circuitry is arranged to perform in-order instruction execution in response to the received instructions and wherein the entries in the register writer storage comprises indications of destination architectural registers and register writing instruction identifiers. In-order execution does not require register renaming and therefore the original specification of the registers in the instructions (architectural registers) can be used in the register writer storage.

The predetermined type of instruction may be of various types, since the present techniques may find applicability in a variety of contexts where instruction dependency graphs are relevant and sets of instructions forming a dependency graph leading to a terminal node of a particular type of instruction may be needed to be identified. However, one particular context is where such dependency graphs lead to a load instruction and accordingly in some embodiments the predetermined type of instruction in the received instructions is a load instruction.

The relevance of the present techniques to load instructions may relate to the fact that such instructions may be associated with particularly long completion times, since a load operation initiated by a load instruction may require data to be retrieved from a memory location and thus take a long time to complete. Accordingly, the need may arise to identify instruction dependency graphs which terminate at a load instruction node, since all of the instructions of that data dependency graph then take on significance when issues of timing are of concern, since in order for the load operation initiated by the load instruction to complete, not only must the instruction itself be executed, but prior to that each of the instructions in the dependency graph which leads to it must also be executed and complete.

The identification of dependency graphs which lead to a load instruction node may be useful in a variety of contexts, but in some embodiments the data processing circuitry comprises: a first execution pipeline to perform first data processing operations; and a second execution pipeline to perform second data processing operations, wherein the data processing operation performed by the data processing circuitry in response to the executed instruction takes place in the first execution pipeline when there is the corresponding instruction identifier for the executed instruction in the instruction tag storage which has the instruction tag, and wherein the data processing operation performed by the data processing circuitry in response to the executed instruction takes place in the second execution pipeline when there is not the corresponding instruction identifier for the executed instruction in the instruction tag storage which has the instruction tag, and wherein the apparatus is arranged to prioritise data processing operations by the first execution pipeline over data processing operations by the second execution pipeline. Such a data processor may be arranged to operate in accordance with a "decoupled access-execute" paradigm, according to which instructions which are categorised as "access" are prioritised over the execution of any other instructions (which by default are considered to be "execute" instructions). Thus, the "access" instructions are passed to and executed in the first execution pipeline, whilst the "execute" instructions are passed to and executed in the second execution pipeline. The provision of the techniques described herein enabling the apparatus to identify and label instructions according to each of these types is therefore of particular benefit in the context of such a decoupled access-execute data processing apparatus, since this means that it can receive a stream of instructions which do not have pre-existing associated instruction tags, but the apparatus is itself able to determine and add these tags on-the-fly as part of its data processing operations.

In some embodiments the instruction tagging circuitry comprises a plurality of instruction tagging engines arranged to perform the tag processing in parallel. This enhances the instruction tagging bandwidth which the instruction tagging circuitry can handle.

In some embodiments the instruction tagging queue comprises a preceding write buffer arranged to feed the instruction tagging queue, and wherein an addition to the instruction tagging queue is performed by writing to the preceding write buffer. The provision of this write buffer enables the various components of the apparatus which interact with the instruction tagging queue to operate at different speeds.

The instruction tag storage may be provided in a variety of ways for the apparatus, but in some embodiments the apparatus further comprises an instruction-information cache to cache information related to the received instructions for provision to the data processing circuitry, wherein the instruction tag storage is provided in association with the instruction-information cache. Such an instruction-information cache may be provided for a variety of purposes, but can for example be provided following a decode stage such that decoded instruction can be cached, so that repeatedly encountered instances of the same instruction do not need to be repeatedly decoded.

In some embodiments the instruction-information cache is a micro-op cache. Accordingly, the instruction tag storage can be provided in association with a micro-op cache, thus effectively labelling instructions (or micro-ops) which are stored in the micro-op cache with the instruction tag when required. This then further means that once an instruction has been tagged (e.g. in the above-mentioned example of a decoupled access-execute processor as an "access" instruction), this tagging is persistent in the micro-op cache, such that whilst the instruction/micro-op remains in an entry of the micro-op cache it is known to be an "access" instruction and further tagging operations are not required.

In some embodiments the apparatus further comprises an instruction-information cache hierarchy, wherein the instruction-information cache hierarchy comprises the instruction-information cache, and wherein eviction of an entry from the instruction-information cache causes eviction of a corresponding entry from the instruction tag storage. The instruction tag storage information (i.e. the instruction tagging) can therefore be evicted from the instruction information cache in association with the entry which is evicted. This thus enables this information to be maintained, albeit at a further level of the instruction-information cache hierarchy.

In some embodiments a further cache level of the instruction-information cache hierarchy is arranged to store entries comprising the instruction identifiers with associated instruction tags, and wherein the instruction-information cache hierarchy is responsive to a received instruction having an entry in the further cache level of the instruction-information cache hierarchy and having no entry in the instruction tag storage to cause the entry in the further cache level of the instruction-information cache hierarchy to be brought into the instruction tag storage. Accordingly, when this tagging information is evicted to a further level of the instruction-information cache hierarchy, it may then also be brought back into the instruction-information cache and thus even instructions which have been evicted after having been tagged do not lose their tagging information.

In some embodiments the instruction tagging circuitry is responsive to reception of an instruction identifier of the predetermined type of instruction from the instruction tagging queue to store a no-process marker in association with the instruction identifier of the predetermined type of instruction, wherein the register mapping circuitry is responsive to the no-process marker when encountering the instruction instance of the predetermined type of instruction in the received instructions to suppress addition to the instruction tagging queue of the instruction identifier for the instruction instance of the predetermined type of instruction. The no-process marker can therefore be used to ensure that the tagging capability of the apparatus is not brought to bear on particular instructions. For example on the one hand there may be some instructions which are known a priori not to require tagging (e.g. cannot be access instructions), for example branch instructions and stores without register write-backs can be automatically tagged as execute (or at least not have the access tag associated with them). Equally on the other hand certain instructions that have already been processed can be tagged "no-process" to indicate that they have already been processed such that they should not re-enter the tagging process.

In some embodiments the apparatus further comprises an instruction-information cache to cache information related to the received instructions for provision to the data processing circuitry, wherein the instruction tag storage is provided in association with the instruction-information cache, and wherein the instruction tagging circuitry is arranged to store the no-process marker in association with the instruction identifier of the predetermined type of instruction in the instruction-information cache. The no-process marker can therefore be maintained in the instruction-information cache, allowing this information to accompany each instance of the instruction which is executed and allowing this information to accompany its instruction even when the instruction is for example evicted to a further cache level.

In some embodiments the instruction tagging circuitry is responsive to a lack of instruction identifiers in the instruction tagging queue to enter a low power state. If no new instructions of the predetermined type are encountered, then the instruction tagging queue will eventually drain of content and in response to this the instruction tagging circuitry can be power- or clock-gated in order to save power.

The instruction tags may take a variety of forms, but in some embodiments the instruction identifiers in the instruction tag storage comprise positions in the instruction tag storage, and wherein storage of the instruction tag in association with the instructions identifier comprises storing a predetermined marker at a position in the instruction tag storage which corresponds to the instruction identifier.

At least one embodiment described herein provides a method of operating an apparatus, the method comprising: performing data processing operations in response to received instructions; storing entries in an instruction tag storage comprising instruction identifiers, wherein an instruction tag is selectively stored in association with each instruction identifier, and wherein a data processing operation performed in response to an executed instruction is dependent on whether there is a corresponding instruction identifier for the executed instruction in the instruction tag storage which has the instruction tag; creating an entry in a register writer storage for each register writing instruction in the received instructions which causes a result value to be written to a destination register, wherein the entry comprises an indication of the destination register and a register writing instruction identifier; buffering instruction identifiers in an instruction tagging queue, wherein in response to encountering an instruction instance of a predetermined type of instruction in the received instructions an instruction identifier is added to the instruction tagging queue for the instruction instance of the predetermined type of instruction; and receiving from the instruction tagging queue the instruction identifiers and for each instruction identifier performing tag processing comprising: creating an entry in the instruction tag storage and storing the instruction tag in association therewith; and for a subject instruction identified by the instruction identifier determining one or more producer instructions which each produce at least one data value which is a source operand of the subject instruction and adding the one or more producer instructions to the instruction tagging queue.

At least one embodiment described herein provides an apparatus comprising: means for performing data processing operations in response to received instructions; means for storing instruction tag entries comprising instruction identifiers, wherein an instruction tag is selectively stored in association with each instruction identifier, and wherein a data processing operation performed by the means for performing data processing operations in response to an executed instruction is dependent on whether there is a corresponding instruction identifier for the executed instruction in the means for storing instruction tag entries which has the instruction tag; means for storing register writer information; means for creating an entry in the means for storing register writer information for each register writing instruction in the received instructions which causes a result value to be written to a destination register, wherein the entry comprises an indication of the destination register and a register writing instruction identifier; means for queuing instruction identifiers for instruction tagging, wherein in response to encountering an instruction instance of a predetermined type of instruction in the received instructions an instruction identifier is added to the means for queuing instruction identifiers for instruction tagging for the instruction instance of the predetermined type of instruction; and means for receiving from the means for queuing instruction identifiers for instruction tagging the instruction identifiers and means for performing, for each instruction identifier, tag processing, the means for performing tag processing comprising: means for creating an entry in the means for storing instruction tag entries and for storing the instruction tag in association therewith; means for determining, for a subject instruction identified by the instruction identifier, one or more producer instructions which each produce at least one data value which is a source operand of the subject instruction; and means for adding the one or more producer instructions to the means for queuing instruction identifiers for instruction tagging.

Particular embodiments will now be described with reference to the figures.

FIG. 1A shows a scenario which demonstrates a context in which the present techniques are particularly relevant. This figure shows (at the left hand side) a sequence of instructions comprising both access (A1, A2, etc.) and execute (E1, E2, etc) instructions which are received by a prior art processor in a single stream interleaved as shown. Suppose that the access instruction A3 is a "load" instruction which provides information required by the execute instruction E1. If the access instruction A3 triggers a cache miss, the sequence of execute instructions beginning with E1 will be stalled, until the data requested is delivered by the memory system. This has the further negative consequence that the whole pipeline then fills with stalled execute instructions, limiting its speculation depth, and eventually forcing it to stall.

Figure 1B:
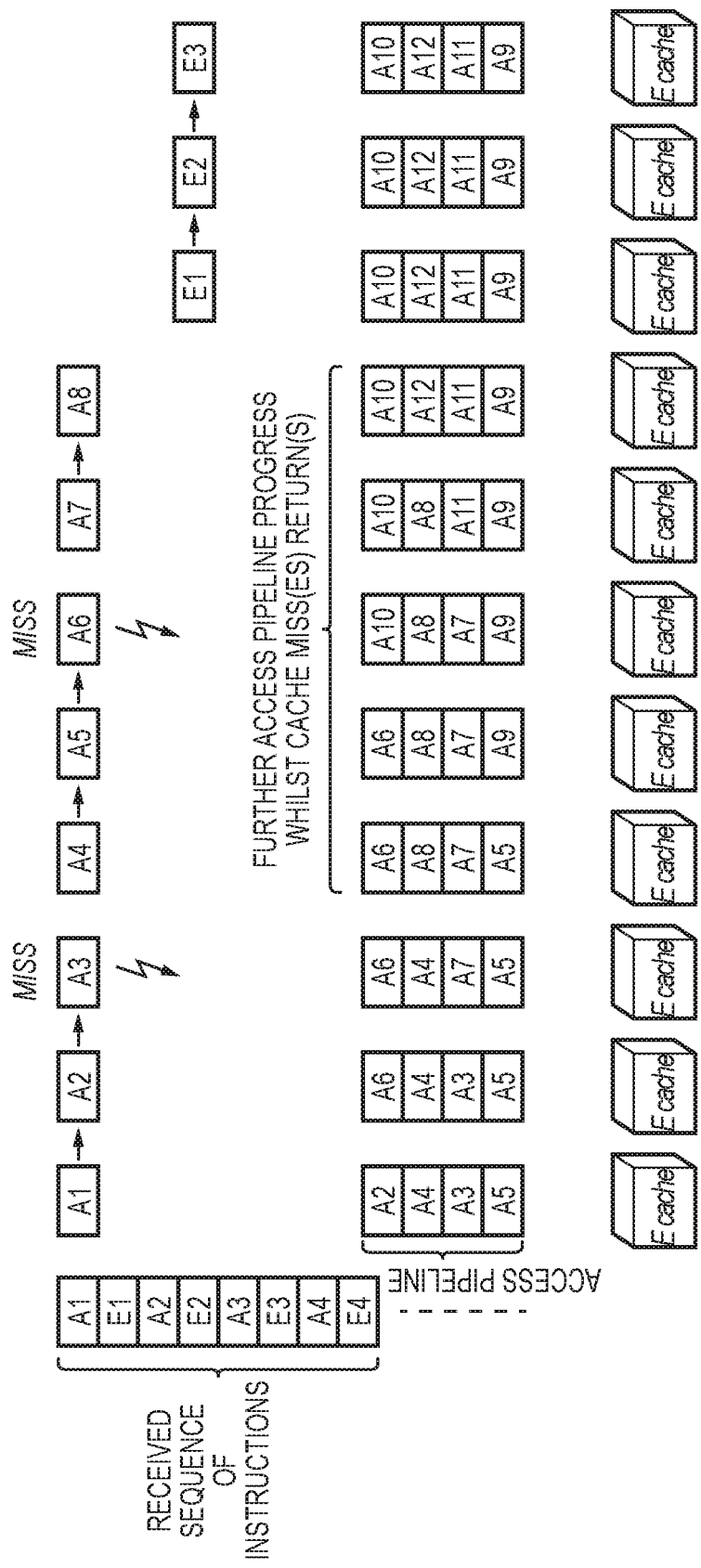
FIG. 1B illustrates the same sequence of instructions being received by a processor according to some embodiments, where prioritising execution of the access instruction and deferring execute instructions allows greater instruction execution progress to be made.

FIG. 1B shows the applicability of the present techniques to the same context, in which the same sequence of instructions comprising both access (A1, A2, etc.) and execute (E1, E2, etc) instructions is received by a processor according to the present techniques. Here the pipeline shown belongs to the "access" pipeline portion of the processor, and it can be seen that by prioritising access instructions (being handled in the access pipeline shown) and by deferring the execute instructions (E1-E3, which may then be handled by an "execute" pipeline portion of the processor (not shown), the full processor is able to execute more instructions during the time it takes to access the data which instruction E1 is waiting for. In fact, if the access portion of the program is able to uncover another potentially long latency event (e.g. cache miss) when A6 is executed, for example, then the cost of this "miss" is amortized by initiating the data access in advance of the point at which it would normally occur. Note that execute instructions are deferred by placing them in a temporary storage area or cache ("E cache" in the figure) designed to remain passive for several cycles until data arrives.

Figure 2:
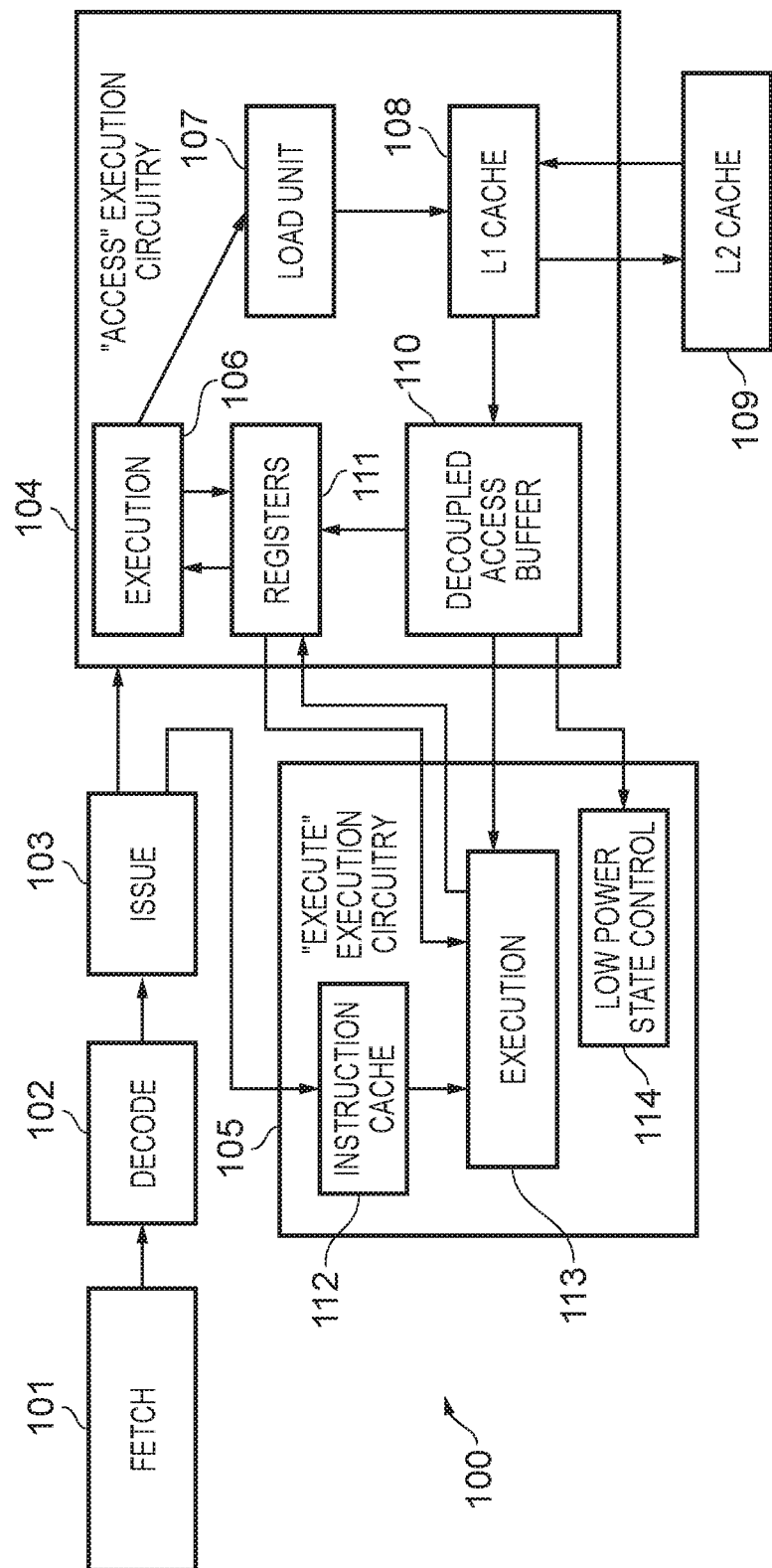
FIG. 2 schematically illustrates a data processing apparatus in some embodiments.
Figure 8A:
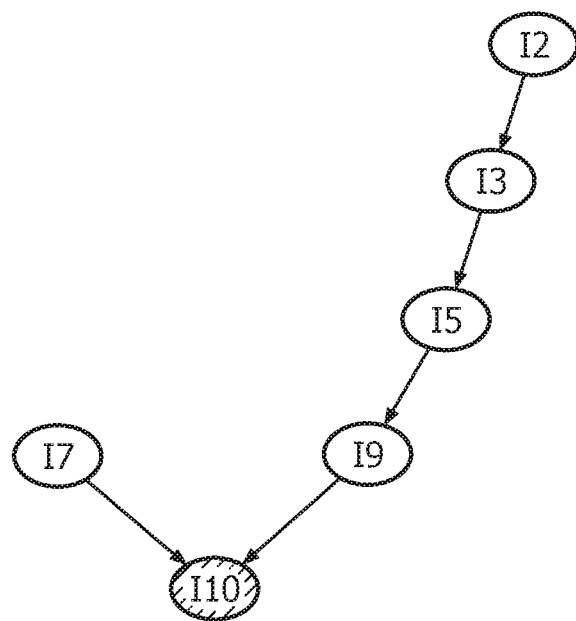
FIG. 8A and FIG. 8B show data dependency graphs for an example sequence of instructions, where
Figure 8B:
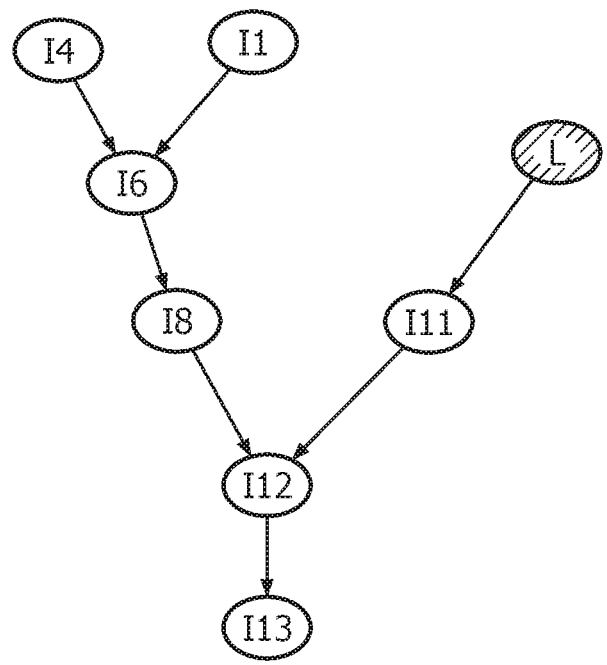

FIG. 2 schematically illustrates a data processing apparatus according to some embodiments. A single set of "front end" circuitry, comprising fetch circuitry 101 and decode circuitry 102, is provided which retrieves and decodes an ordered sequence of instructions which the data processing apparatus is to execute. Decoded instructions are passed to the issue circuitry 103. The issue circuitry 103, in accordance with the present techniques, is arranged to identify labelling associated with at least some of the instructions in the received ordered sequence of instructions. In particular, the issue circuitry 103 responds to the identification of an "access" label associated with an instruction to issue this instruction to the access execution circuitry 104 for execution. Conversely, instructions which do not have the "access" label are directed to the "execute" execution circuitry 105 for execution. Whilst in some examples there may be two explicit types of label, in the illustrated example in fact there is only the access label. Hence instructions with this label are directed to the access execution circuitry 104 and conversely any instructions without the access label are directed to the execute execution circuitry 105. The access label is associated with all access-related instructions which determine at least one characteristic of a load operation to retrieve a data value from a specified memory address. FIGS. 8A and 8B and their associated description illustrate the definition of an access instruction according to the present techniques, where it can be seen that an access dependency graph includes all instructions which lead to a terminal node which represents a load instruction.

The access execution circuitry comprises an execution portion 106, which may for example be arranged in a pipelined manner. It will be recognised that the schematic illustration of FIG. 2 is only at a high level of abstraction, in order to provide an overview of the general principle of construction of the data processing apparatus 100. Of particular note, however, in the access execution circuitry 104 is the load unit 107 to which a load operation defined by a load instruction executed by the execution portion 106 is delegated. Such a load operation first accesses the L1 cache 108 which also forms part of the access execution circuitry 104 and (should the access miss there) may pass further out to the L2 cache 109 (and potentially further into the memory system). Data values returned from the memory system and/or cache hierarchy enter the L1 cache 108 and data values returned by the cache subsystem are placed into the decoupled access buffer 110, which forms part of the access execution circuitry 104. These values may also be provided into the registers 111 which the execution portion 106 accesses as part of the data processing operation which it carries out.

Instructions which do not have the "access" label are issued by the issue circuitry 103 to the execute execution circuitry 105. The instructions received are temporarily held in the instruction cache 112, enabling these instructions to be delayed, whilst the parallel execution of the access instructions is prioritised and proceeds in the access execution circuitry 104. The decoupled access buffer 110 is arranged to send certain signals regarding its content to the execute execution circuitry 104. Thus, when a data item retrieved from memory by the action of a load operation becomes available in the decoupled access buffer 110, this fact can be signalled to the execution portion 113 of the execute execution circuitry 105 which can then make use of that value in executing a particular instruction. The execution portion 113 may also make use of values held in the registers 111 and conversely, as a result of its own data processing operations, cause certain updates to be made to the content of the registers 111. Where the data processing of the execute execution circuitry 105 is dependent on the processing carried out by the access execution circuitry 104, a further feature of the example embodiments shown in FIG. 2 is the provision of the low power state controlled circuitry 114 of the execute execution circuitry 105. This receives a notification from the decoupled access buffer 110 when the decoupled access buffer 110 drains (becomes empty) and in response to this the low power state control 114 causes the execute execution circuitry 105 to enter an inactive, low power (or low frequency of operation) state. Conversely, when the decoupled access buffer 110 has content once more, the low power state control 114 can cause the execute execution circuitry 105 to become active again (i.e. fully powered or operate at a higher frequency than before) and begin further instruction execution. Whilst the execute execution circuitry 105 could be woken up in this manner as soon as there is any content in the decoupled access buffer 110, in the example of FIG. 2, the decoupled access buffer 110 signals to the low power state control 114 when its content meets a predetermined threshold content (i.e. minimum content), such that the power saving advantage of operating the execute execution circuitry 105 in this manner is improved and it is only woken up in order to continue instruction execution once there is a sufficient number of data values available in the decoupled access buffer 110. The particular level of this threshold can be set as an implementation detail, depending on the system requirements.

Figure 3:
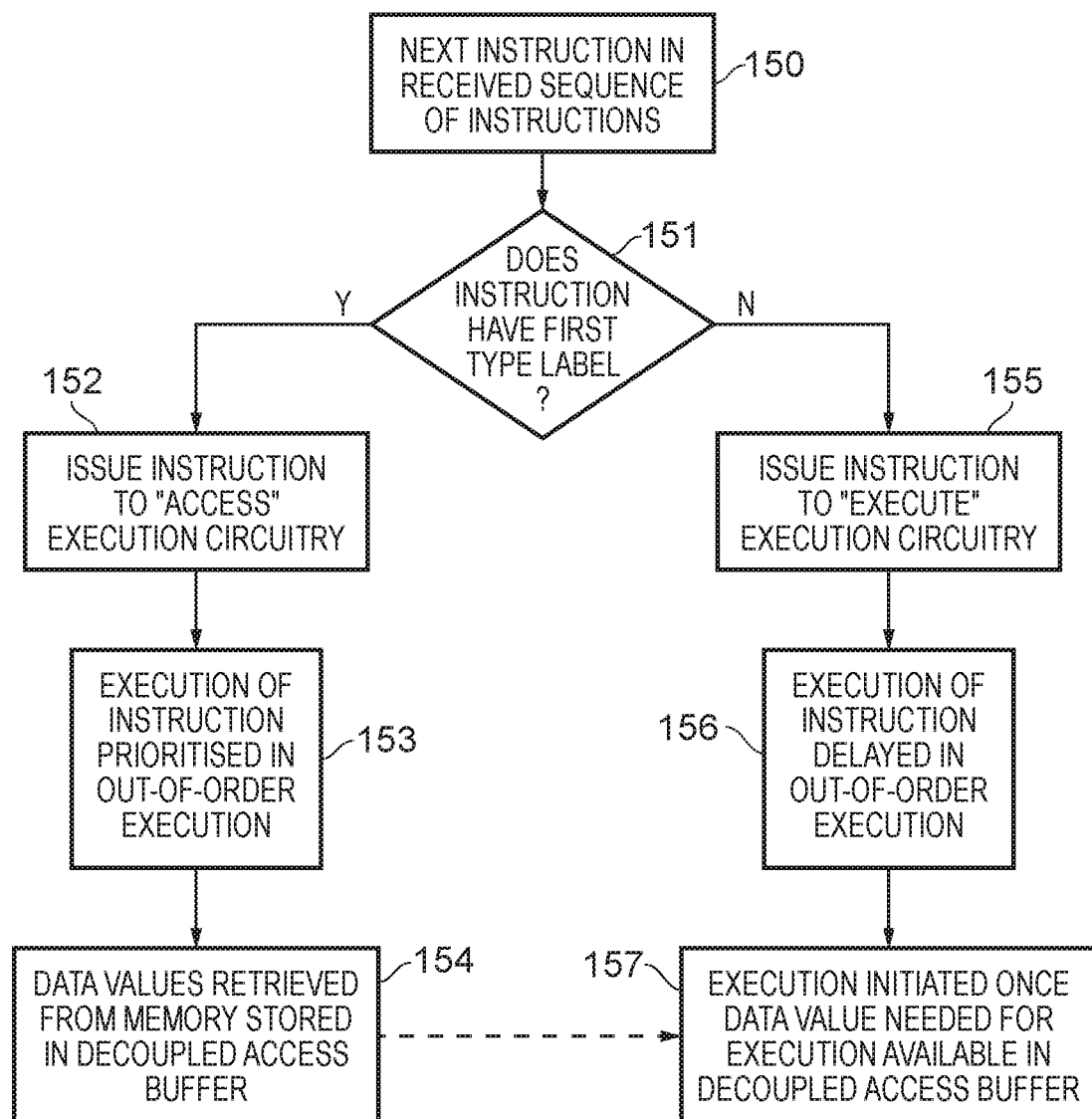
FIG. 3 shows a sequence of steps which are taken in a processor according to the method of some embodiments.

FIG. 3 is a flow diagram showing a sequence of steps which are taken according to the method of some embodiments. In particular FIG. 3 shows the manner in which instructions within a received sequence of instructions are handled according to the present techniques. The flow begins at step 150 where the next instruction in a received sequence of instructions is considered. It is determined at step 151 whether or not the instruction has the first type ("access") label. When it does, the flow proceeds to step 152 where the instruction is issued to the access execution circuitry. Then at step 153 the execution of the instruction is prioritised in the out-of-order execution of instructions performed by the access execution circuitry. Then at step 154, when one or more data values retrieved from the memory system are returned, this value or these values are stored in the decoupled access buffer. If however at step 151 it is found that the instruction does not have the first type label, then the flow proceeds to step 155 where the instruction is issued to the execute execution circuitry. Then at step 156 this instruction is delayed, (for example being held in an instruction cache or buffer) as part of the out-of-order instruction execution performed by the execute execution circuitry. Once a data value required for this instruction becomes available in the decoupled access buffer, at step 155 its execution is initiated. For example, when the instruction is held in the execute instruction execution circuitry, the presence of its required data value in the decoupled access buffer can be used to trigger its execution. Note that the dashed path from step 154 to step 157 indicates the dependency of step 157 on actions resulting from the other path, but this is not a true step in the procedural flow illustrated.

Figure 4:
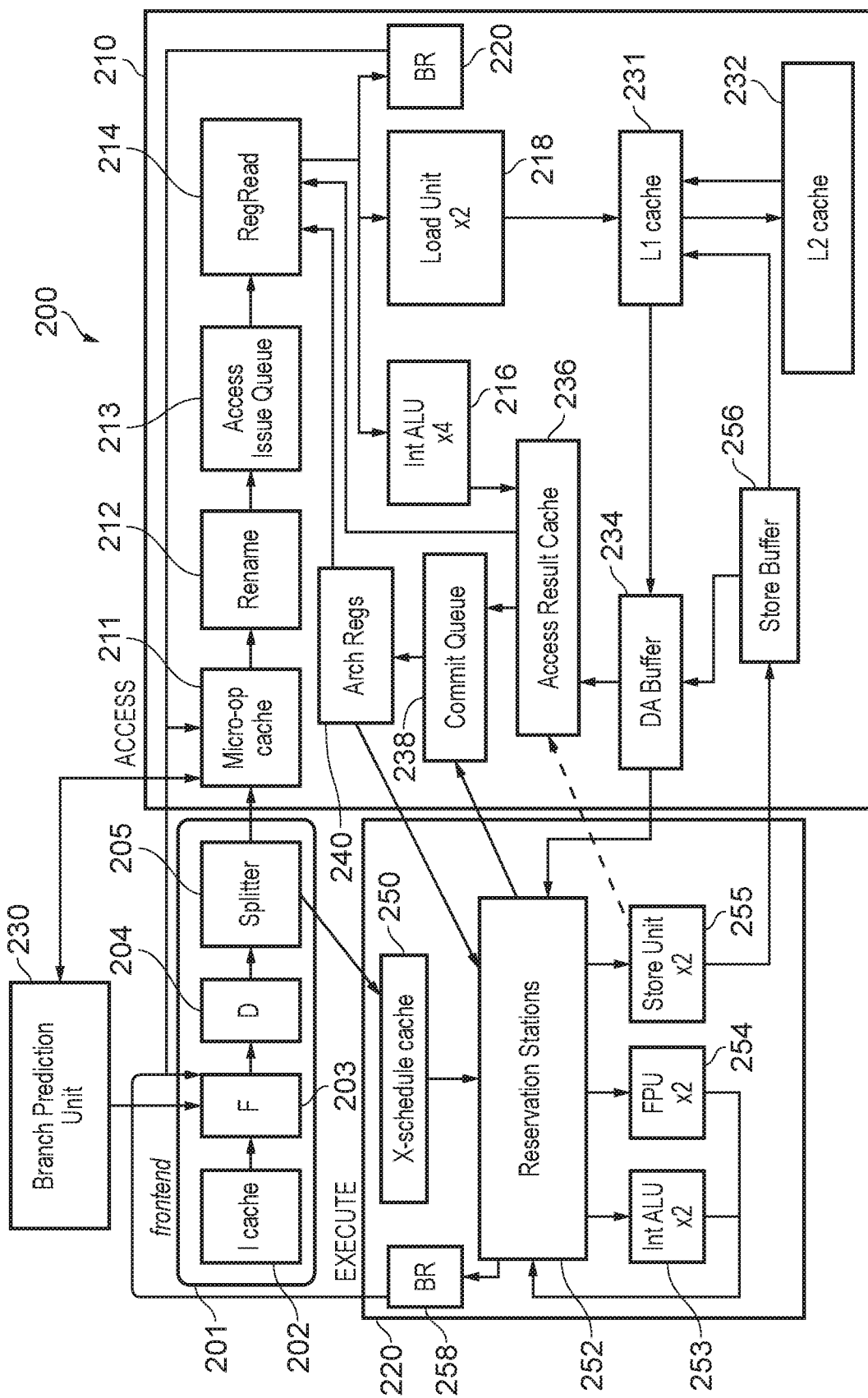
FIG. 4 schematically illustrates a data processing apparatus in some embodiments.

FIG. 4 schematically illustrates an example data processing apparatus 200 according to some embodiments. A single set of front end circuitry 201 comprises an instruction cache 202, fetch circuitry 203, decode circuitry 204, and splitter 205. Accordingly, the received ordered sequence of instructions reach the splitter 205, which then is arranged to direct the instructions either to the access circuitry 210 or the execute circuitry 220 in dependence on whether the instruction has an associated "access" label or not. When it does the instruction passes into the access circuitry 210, the first stages of which are shown to be the micro-op cache 211, the rename circuitry 212, the issue queue 213, and the register read stage 214. These pipelined components are arranged in a manner with which one of ordinary skill in the art will be familiar and are not described in detail here. Further, from the register read stage 214, depending on the nature of the instruction, corresponding signals pass to the integer ALU units 216, the load units 218, and/or the branch resolution (BR) unit 220. It will therefore be appreciated that the access circuitry 210 is capable of executing a variety of types of instruction (notably not only load instructions) and indeed the particular execution units 216, 218 as shown in FIG. 2 are merely examples and other execution units could be provided. The results of branch resolutions (as determined in the BR unit 220) are passed back to the fetch unit 203 and the micro-op cache 211. Note further that the data processing apparatus 200 is also provided with a branch prediction unit 230, which interacts with the content of the micro-op cache 211 and indicates to the fetch unit 203 when it is predicted that a branch will be taken and a corresponding jump in the fetched instructions should be implemented.

The integer ALU units 216 perform their data processing operations with respect to values held in registers of the access portion 210, which may have been retrieved from the cache/memory system. The retrieval of these values from memory (by the action of load operations) is carried out by the load units 218 and FIG. 4 illustrates the interaction of these load units with a L1 cache 231, which forms part of a cache hierarchy including an L2 cache 232. Further cache levels may also be provided leading into the memory system (not shown). Values returned from the cache/memory system are caused to be stored in the decoupled access (DA) buffer 234. With reference to the above-referenced data processing operations of the integer ALU units 216, these results also feed into the access result cache 236 to which the integer ALU units 216 have access as part of performing their data processing operations. Modifications to these values which are performed are passed into a commit queue 238, before being applied to the registers 240 of the data processing apparatus 200.

Instructions which are received in the ordered sequence of instructions and do not have the access label are passed from the splitter 205 to the execute circuitry 220. In particular they are first received in the X-schedule cache 250, where they are held in order to be delayed with respect to the access instructions which are prioritised in their execution in the access circuitry 210. The execute instructions may be held in the X-schedule cache 250 in a compact, pre-execution form, i.e. not fully unpacked and expanded as they will finally be when executed, in order to allow a compact provision of this cache 250. The execute circuitry 220 comprises reservation stations 252 which enable it to administer its own out-of-order execution of instructions and in particular to keep track of instruction dependencies and operand availability. The execute circuitry 220 also comprises two integer ALU units 253 and two floating point units (FPU) 254, as well as two store units 255. In executing its instructions the execute circuitry 220 is therefore arranged such that values required by the ALUs 253 and the FPUs 254 are received from the reservation stations 252 and the results of data processing performed by these units are passed back to the reservation stations 252. The execute circuitry 220 also comprises a branch resolution (BR) unit 258, which like the BR unit 220 of the access circuitry 210 signals to the fetch circuitry 203 of the front end circuitry 201.

The reservation stations 252 pass result values to the commit queue 238 of the access circuitry 210 in order for register values to be updated. Data values which are to be written out to memory are passed from the reservation station 252 to the store units 255. Store transactions initiated by the store units 255 are temporarily buffered in a store buffer 256 of the access circuitry 210. This enables write data to be buffered until the store is "committed". This also provides a window of opportunity to identify cases where the address of a store transaction matches that of load which has brought a value into the decoupled access buffer 234. Updates which could cause a data hazard (i.e. a collision between a younger load and an older store) are identified, such that remedial action can be taken and this feature is discussed in more detail with reference to FIG. 5 below.

Figure 5:
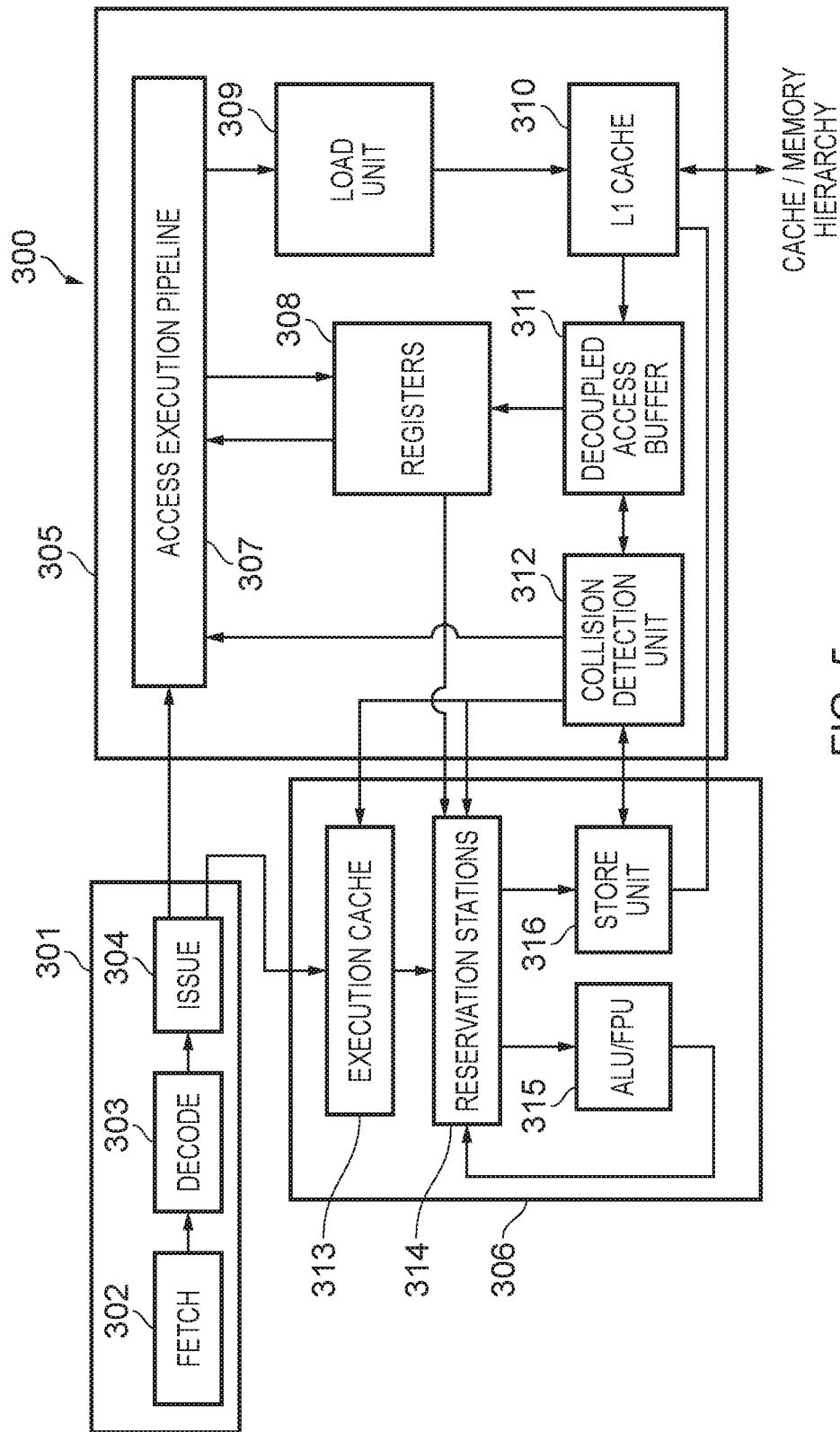
FIG. 5 schematically illustrates a data processing apparatus in some embodiments.

FIG. 5 schematically illustrates a data processing apparatus 300 in some example embodiments. The data processing apparatus 300 comprises front end circuitry 301, which itself comprises fetch circuitry 302, decode circuitry 303, and issue circuitry 304. In the manner discussed above, the issue circuitry 304 identifies certain instructions with an "access" label associated with them and issues these to the access circuitry 305, whilst other instructions are issued the execute circuitry 306. FIG. 5 is based on the example of FIG. 4, although not all components are illustrated, merely to facilitate clarity of discussion in this example. Instructions received by the access circuitry 305 enter its execution pipeline 307, which performs various data processing operations, some of which involve interaction with the registers 308, and some of which cause the load unit 309 to initiate load transactions with the cache/memory system. In the illustration of FIG. 5 only the L1 cache 310 is shown. Data values returned from the cache/memory hierarchy are passed to the decoupled access buffer 311 and from there some of these values may cause updates to values held in the registers 308 (e.g. via various stages, such as a commit queue—see FIG. 4). A particular focus of the discussion of FIG. 5 is the provision of the collision detection unit 312, which is described in more detail below. The execute circuitry 306 comprises an execution cache 313, reservation stations 314, ALU/FPU units 315, and a store unit 316. The manner in which the execute circuitry 306 operates is essentially the same as that described above for the execute circuitry 220 of FIG. 4 and is not repeated here for brevity. The collision detection unit 312 also interacts with the store unit 316 and in particular is arranged to identify the above-mentioned situation which could result in a data hazard, namely when a collision occurs between a younger load which has been prioritised in the execution carried out by the access circuitry 305 and older store instruction carried out by the execute circuitry 306. When these respective load and store operations concern the same memory address, the possibility for a data hazard occurs, namely where in program order the store should have been carried out before the load, but the ordering has been disrupted by the prioritisation of the load operation according to the present techniques. Moreover where the store and load have been executed in separate, largely independent execution units, namely execute circuitry 306 and access circuitry 305, the mechanisms which would usually avoid such a data hazard within an individual out-of-order processing unit may not suffice.

The particular manner in which the collision detection unit 312 operates is described below in more detail with reference to FIGS. 6 and 7, but when such a data hazard situation is identified, the collision detection unit is arranged to signal this to various parts of the data processing apparatus 300, including the access execution pipeline 307 and the execution cache 313/reservation stations 314, since various instructions will need to be flushed from the respective pipelines and some instructions will need to be re-executed. In some embodiments the data processing apparatus 300 is arranged such that only the load instruction and any subsequent instructions are flushed, but simpler embodiments provide that a full flush of the respective pipelines is triggered when such a data hazard condition is identified, due to simplicity of implementation.

Figure 6:
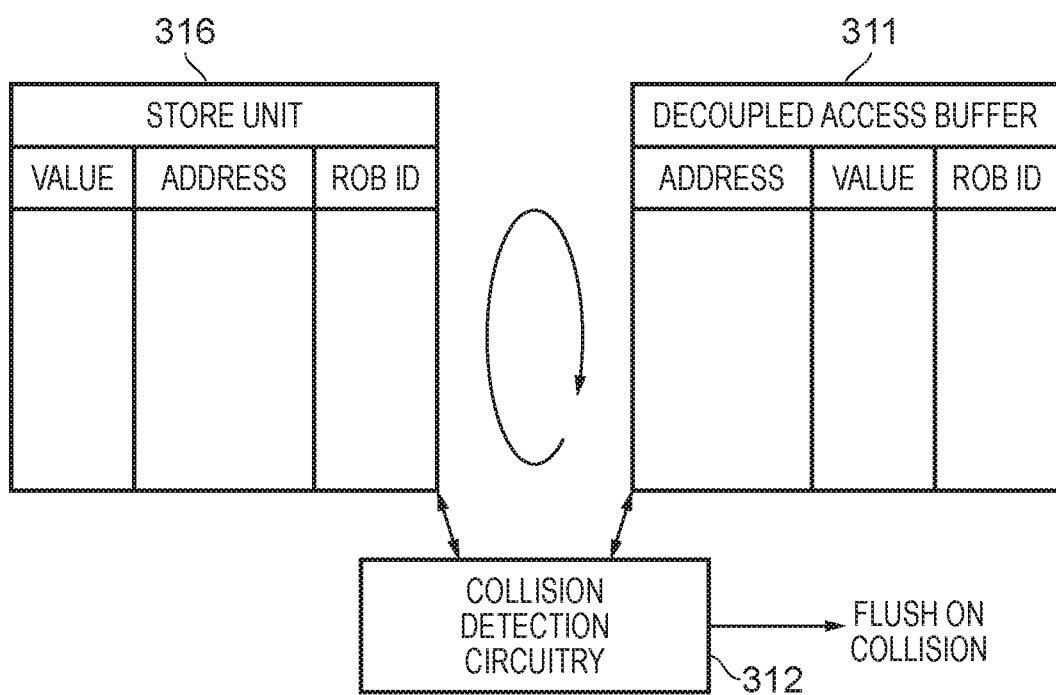
FIG. 6 schematically illustrates collision detection circuitry provided in some embodiments.

FIG. 6 schematically illustrates the operation of the collision detection circuitry 312 with respect of the content of the store unit 316 and the decoupled access buffer 311. The store unit 316, which holds entries concerning store transactions which are still "in flight", i.e. have yet to be committed. Various information associated may be associated with each entry, though of relevance to the present discussion (as shown in the example of FIG. 6) this information comprises the value to be stored, the address at which it is to be stored, and an instruction identifier (which here is provided by a reorder buffer (ROB) ID. The decoupled access buffer 311 also comprises various information related to the entries which it holds, which in the example of FIG. 6 is shown to be an address of the retrieved value, the value itself, and an instruction identifier associated with this load operation, which in the example of FIG. 6 is also the ROB ID. It is known to one of ordinary skill in the art that out-of-order execution pipelines such as those provided by the access circuitry 210 and the execute circuitry 220 of the example of FIG. 4 make use of such a re-order buffer and ROB IDs, in order to maintain knowledge of the program ordering of the instructions which they execute, such that despite the out-of-order execution they carry out, the effect of the instructions can be correctly ordered when the results are committed. The collision detection circuitry 312 is arranged to monitor the respective content of the store unit 316 and the decoupled access buffer 311 and to identify instances in which the address matches between entries. This may for example be carried out by a circular (looping) examination of the entries of one of them, e.g. the DAB 311, taking the address of each entry in turn and checking if there is a matching entry in the other, e.g. the store unit 316. When a pair of addresses are found to match then the respective ordering of the corresponding instructions is determined with reference to the ROB IDs, and when a data hazard is thus identified (a "collision") the collision detection circuitry causes a flush to be carried out. This flush may be a full pipeline flush or may be a partial pipeline flush.

Figure 7:
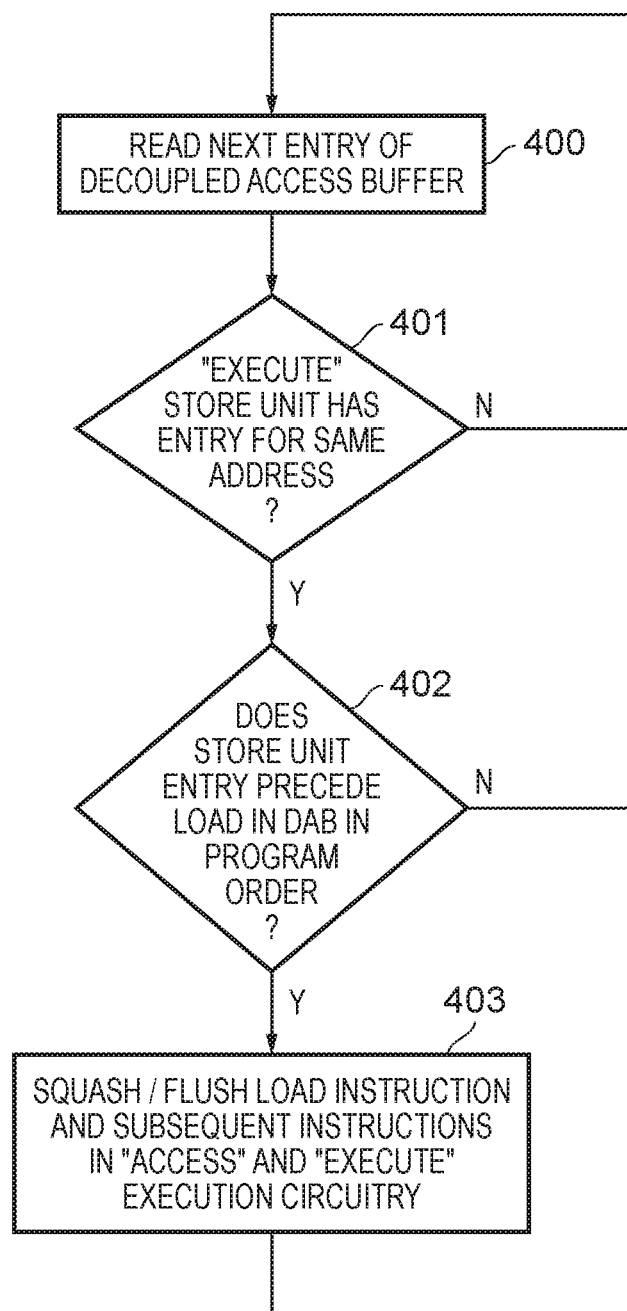
FIG. 7 shows a sequence of steps which are taken by collision detection in the method of some embodiments.

FIG. 7 shows a sequence of steps according to which the collision detection circuitry 312 may operate. At step 400 the next entry of the decoupled access buffer is examined. At step 401 it is then determined if, within the execute store unit, there is an entry for the same address. If it does not, then the flow returns to step 400 for the next entry of the decoupled access buffer to be examined. However, when there is a matching address the flow proceeds to step 402, where it is determined if the store unit entry precedes (in program order) the load which has caused the value to be brought into the decoupled access buffer (DAB). If this is not the case then the flow returns to step 400 for the next entry of the decoupled access buffer to be examined. If, however, this is the case, then a collision condition has been identified and at step 403 the load instruction itself is squashed and any subsequent instructions in the access and execute circuitry are flushed in order to avoid incorrect side-effects of the ordering of the load and store operations having been inverted. In other embodiments a partial pipeline flush is be performed, such that only instructions which are directly or indirectly dependent on the squashed load instruction are also squashed, but the rest of the pipeline remains intact. The flow then returns to step 400.

An example sequence of instructions which a data processing apparatus may receive and execute is as follows:

| I1: | [E] | SUB | x10, x11, x10 |
| I2: | [A] | ADD | x1, x2, x3 |
| I3: | [A] | SUB | x4, x1, x2 |
| I4: | [E] | CLZ | x13, x2 |
| I5: | [A] | LSL | x4, x4, #1 |
| I6: | [E] | MADD | x14, x10, x11, x13 |
| I7: | [A] | ADD | x8, x3, x9 |
| I8: | [E] | CMP | x14, #39 |
| I9: | [A] | EOR | x5, x4, x6, LSR #5 |
| I10: | [A] | LDR | d0, [x5, x8, LSL #3] |
| I11: | [E] | FMSUB | d1, d2, d0, d3 |
| I12: | [E] | FCSEL | d2, d1, d5, GT |
| I13: | [E] | STR | d2, [x12], #4 |

Considering the instruction sequence shown above, and where a load instruction (LDR) is defined to be the "predetermined type of instruction", the labelling of the instructions depends on an analysis of the data dependencies between the instructions. These dependencies are shown in graphical form in FIGS. 8A and 8B. Here, any instruction which supplies a value to a source operand of a load instruction is deemed to be an "access" instruction, and any instruction which supplies a value to a source operand of an "access" instruction is also itself deemed to be an access instruction. Instructions which are not tagged as access instructions, because they are found not to be part of an access data dependency graph, are deemed to be execute instructions. Thus as shown in FIG. 8A the instructions which are in the access data dependency graph, that is I10, I7, I9, I5, I3, and I2 are given the access label "A". The remaining instructions (which do not lead to a "load" directly or indirectly) are marked as execute (E), which includes I13, I12, I11, I8, I6, I14, and I1. The present techniques are concerned with identifying such data dependency graphs for a sequence of instructions which a data processing apparatus receives, and in particular, as will be described in more detail below with reference to the figures which follow, the present techniques provide apparatuses and methods which allow a data processing apparatus to elaborate such access data dependency graphs and label the constituent instructions thereof with the "access" label, this being performed online, i.e. on-the-fly as the data processing apparatus receives and executes instructions.

Figure 9:
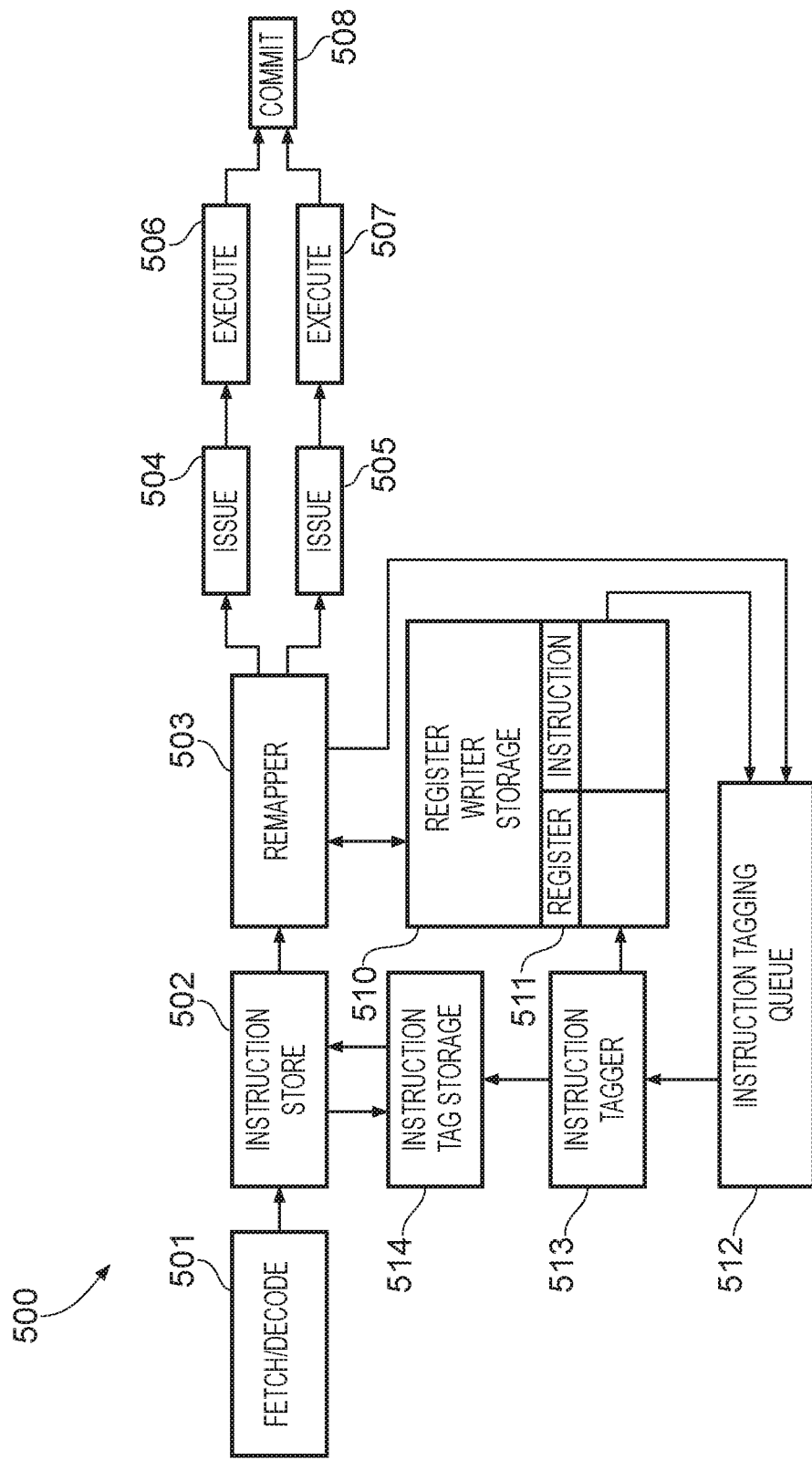
FIG. 9 schematically illustrates a data processing apparatus in accordance with some embodiments.

FIG. 9 schematically illustrates a data processing apparatus according to some embodiments. Shown schematically, the data processing apparatus 500 comprises a fetch/decode stage 501, which fetches and decodes the instructions of the sequence of instructions to be executed by the data processing apparatus. These decoded instructions are stored in the instruction store 502, from where the remapper circuitry 503 accesses them and performs any required remapping of instruction-specified registers. From the remapper stage, instructions are passed either to the issue circuitry 504 or to the issue circuitry 505. The issue circuitry 505 issues instructions for execution by the execute circuitry 506, whilst issue circuitry 505 issue instructions for execution by the execute circuitry 507. These parallel pipelines come together again in a final commit stage 508. Register writer storage 510, which is accessed by the remapper circuitry 503, is also provided in which entries are created by the remapper circuitry 503. An entry 511 of the register writer storage 510 comprises an instruction indication and a register indication. Specifically, for each instruction encountered by the remapper circuitry 503 it creates an entry in the register writer storage 510, which indicates the instruction and its destination register (i.e. a register, the content of which is written to by that instruction). Note that in the case of an out-of-order processor, the registers referred to in an entry 511 of the register rewriter storage 510 are physical registers (where in this case the remapper 503 is a renaming stage, arranged to administer mappings between architectural registers referenced in instructions and physical registers of the data processing apparatus). Conversely, in the case of an in-order processor, the registers referred to in entries 511 of the register rewriter storage 510 can be architectural registers (i.e. as referred to in the instructions). Note that some instructions may have more than one destination register, so multiple entries 511 in the register rewriter storage 510 may be created in response to a single instruction.

FIG. 9 also shows that the data processing apparatus 500 further comprises an instruction tagging queue 512, instruction tagging circuitry 513, and instruction tag storage 514. The instruction tag storage 514 is provided in association with the instruction store 502, such that an instruction in the instruction store 502 can be associated (or not) with a tag stored in the instruction tag storage 514. Indeed, in some embodiments the instruction store 502 and the instruction tagged storage 514 may be merged into a single storage unit, in which tags are directly stored in association with instructions. However in other embodiments the instruction store 502 is not present and the instruction tag storage 514 operates by receiving tags generated by the instruction tagger 513 and providing them directly to the front-end of the processor (FIG. 15B described below schematically illustrates an embodiment of this type). The instruction tagging instruction circuitry 513 operates by taking a next instruction identifier queued in the instruction tagging queue 512 and writing into the instruction tag storage 514 to indicate that this instruction is "tagged". For example when the above described categorisation of instructions as either "access" or "execute" is required, the tagging of an instruction indicates that this is a defined "access" instruction (whilst untagged instructions are interpreted to be "execute" instructions).

In addition to causing a tag to be stored in the instruction tag storage 514, the instruction tagger 513 also determines for the instruction whether it has any producer instructions. Producer instructions are those instructions which generate at least one source operand for the instruction. Thus, on the basis of the specified source register(s) for the current instruction, the instruction tagger 513 refers to the register writer storage 510 to determine if there are any entries stored therein which indicate this or these registers. When this is the case the corresponding instruction identifier from the entry in the register writer storage 510 is caused to be added to the instruction tagging queue 512. Accordingly, chains or graphs of data dependencies leading to a predetermined type of instruction (in this example embodiment a load instruction) can be identified and each instruction thereof can be tagged. Notice also the path from the remapper 503 to the instruction tagging queue 512. This is used to initiate the process by inserting load instruction identifiers for any load instructions encountered into the instruction tagging queue. Accordingly the instruction tagger 513 receives instruction identifiers from the instruction tagging queue 12, which are either written to this queue by a previous iteration in which the instruction tagger 513 identified a producer instruction in the register writer storage 510 and caused that or those producer instructions to be added to the instruction tagging queue, or are inserted into the instruction tagging queue by the remapper 503 when it encountered a load instruction.

Figure 10:
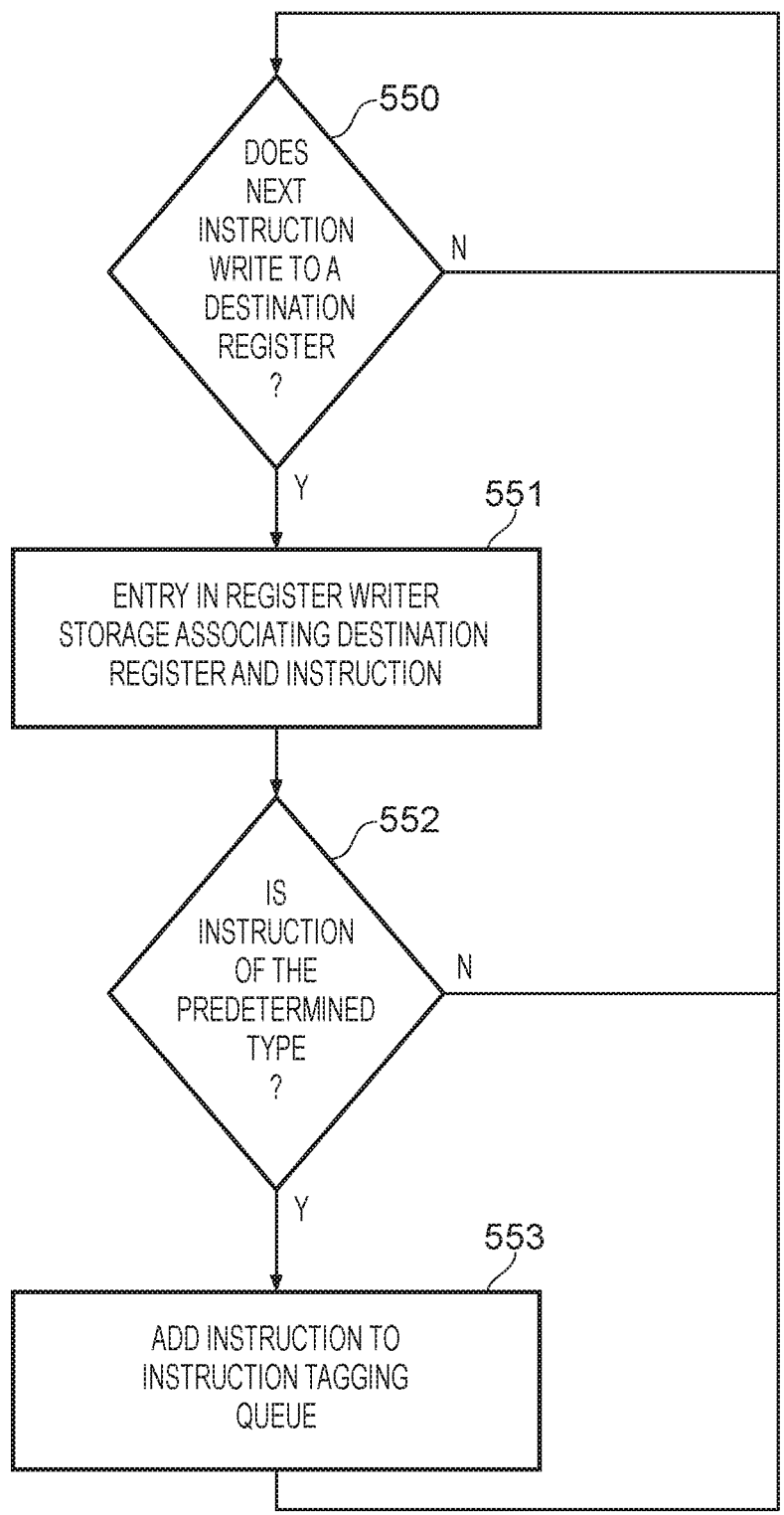
FIG. 10 is a flow diagram showing a sequence of steps which are taken according to the method of some embodiments.

FIG. 10 is a flow diagram showing a sequence of steps which are taken according to the method of some embodiments, in particular describing the operation of a component such as the remapper 503 in the data processing apparatus 500 in the example of FIG. 9. The flow can be considered to begin at step 550 where this component encounters a next instruction in the sequence of instructions which the data processing apparatus is executing. It is determined at step 550 if this instruction writes to a destination register. If it does not then the flow loops on itself to consider the next instruction in sequence. However, when this is true the flow proceeds to step 551 where an entry is created in the register write storage associating the destination register and the instruction. Next, at step 552 it is determined if the instruction is of the predetermined type. For example this may be a determination of whether the instruction is a load instruction. If it is not then the flow returns to step 550. When this is true the flow proceeds to step 553, where the instruction (i.e. an identifier thereof) is added to the instruction tagging queue. The flow then returns to step 550.

Figure 11:
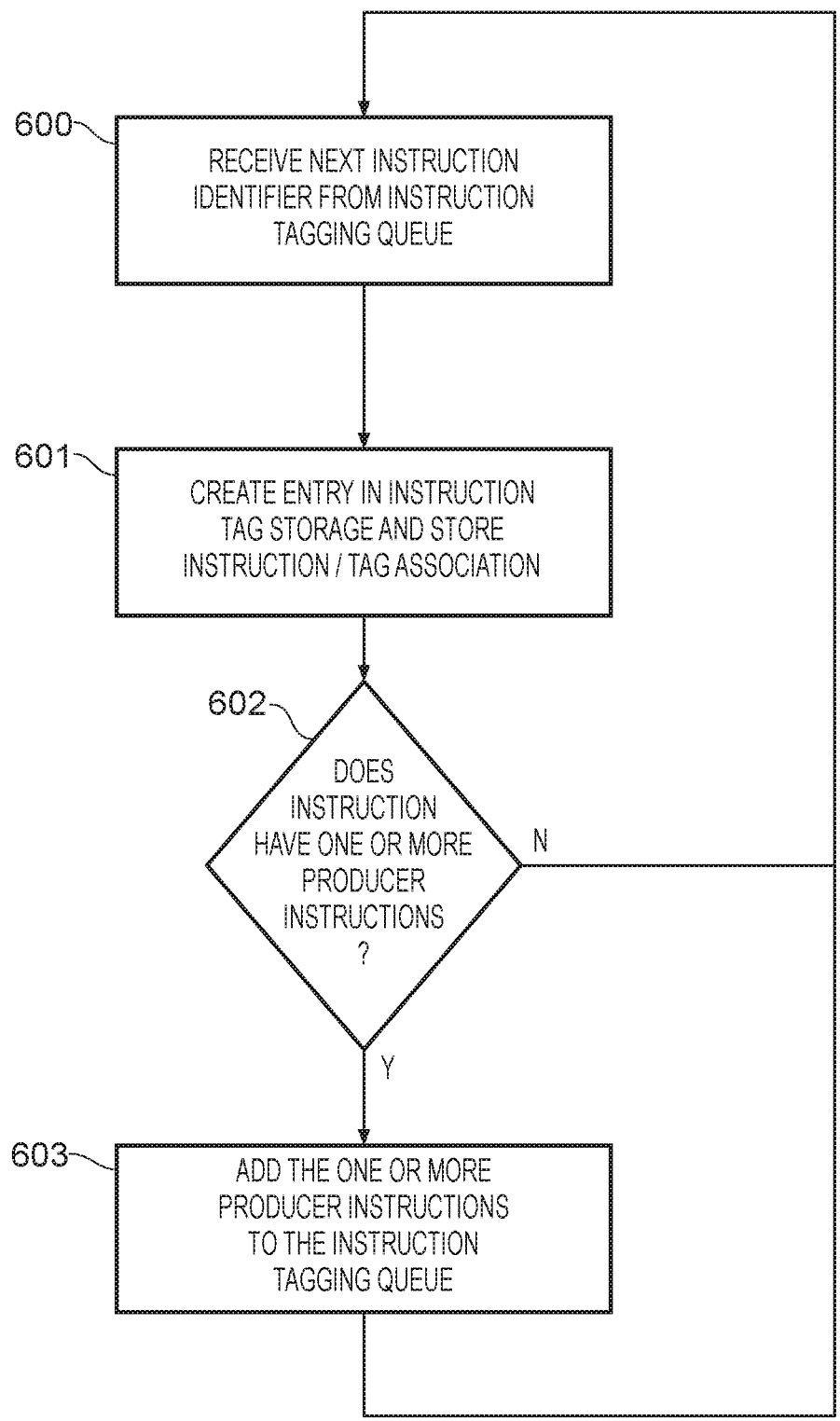
FIG. 11 is a flow diagram showing a sequence of steps which are taken according to the method of some embodiments.

FIG. 11 is a flow diagram showing a sequence of steps which are taken according to the method of some embodiments, in particular those steps carried out in order to tag instructions, as may be carried out by the instruction tagging circuitry 513 of the data processing apparatus 500 in FIG. 9. The flow can be considered to begin at step 600, where the next instruction is received from the instruction tagging queue. Then at step 601 an entry in the instruction tag storage is created, thus "tagging" this instruction, where the association between this instruction and its tag forms the entry in the instruction tag storage. Then at step 602 it is determined if this instruction has one or more producer instructions, i.e. whether at least one source operand of the instruction is given by the content of a register which has been written to by another instruction. As described above with reference to FIG. 9 this may for example be performed by reference to the register writer storage 510 and the entries stored therein. If the instruction does not have any producer instructions, or the producers are not available in the instruction store 502 or the producer instructions have already been previously tagged, then the flow returns to step 600 for the next instruction in the instruction tagging queue to be processed. However, when one or more producer instructions are identified, then indications of these are added to the instruction tagging queue at step 603 and then the flow returns to step 600.

Figure 12:
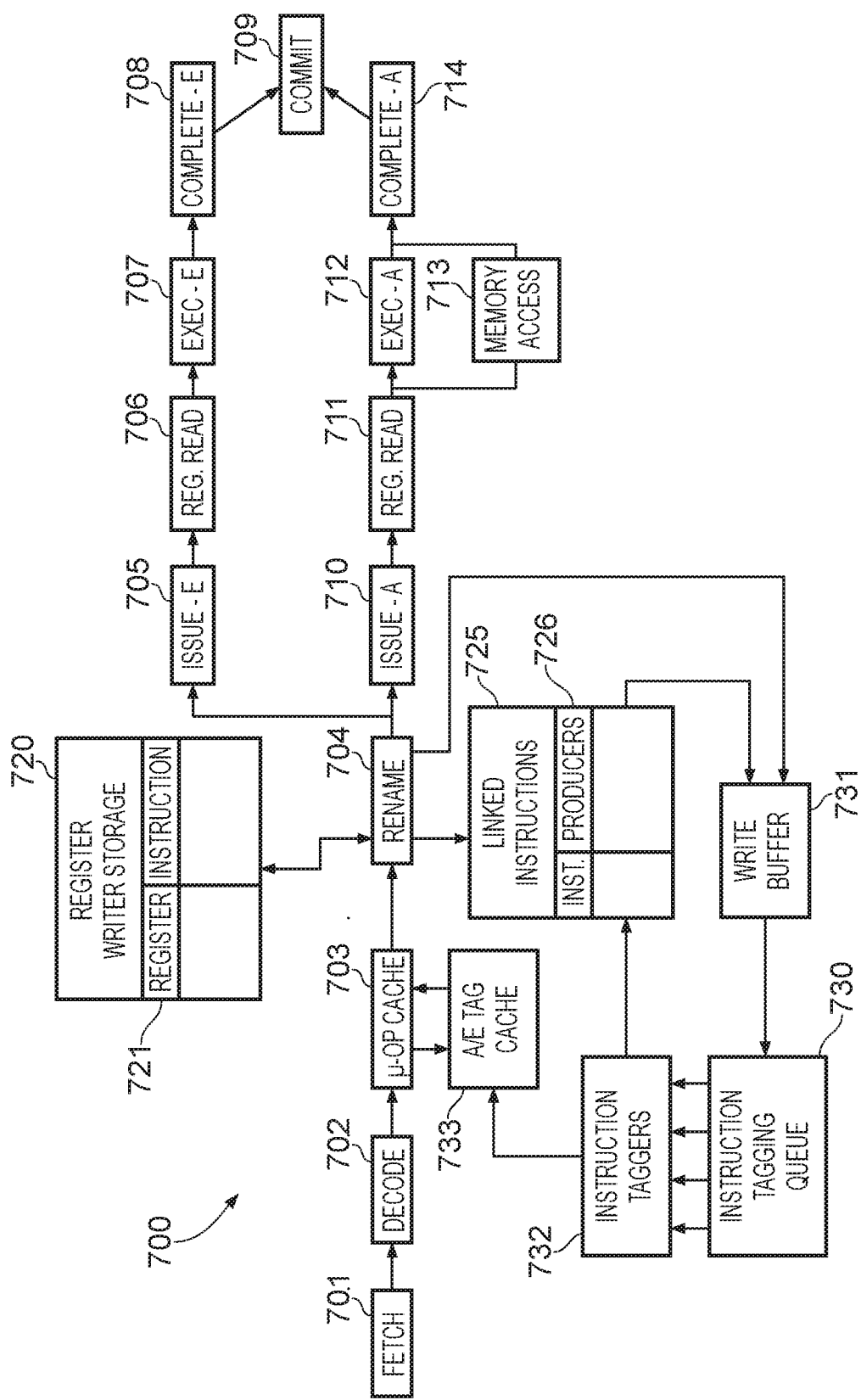
FIG. 12 schematically illustrates a data processing apparatus in accordance with some embodiments.

FIG. 12 schematically illustrates a data processing apparatus 700 according to some embodiments. Fetch circuitry 701 and decode circuitry 702 operate to retrieve a sequence of instructions to be executed from memory and to decode them. Decoded instructions, which may be subdivided into micro-ops, populate the micro-op cache 703. The next pipeline stage is the rename circuitry 704. The data processing apparatus 700 is arranged to perform out-order instruction execution and accordingly renaming of architectural to physical registers is carried out in order to support this. Thereafter, depending on whether a given instruction is labelled "A" (i.e. an access instructions) or "E" (i.e. an execution instruction) it is passed to one of the two execution pipelines illustrated. The "execute" pipeline is schematically represented in FIG. 12 by the issue stage 705, the register read stage 706, the execution stage 707, and the completion stage 708. A final commit stage 709 is shared with the other pipeline. The other "access" pipeline is schematically represented in FIG. 12 by the issue stage 710, the register read stage 711, the execution stage 712, the memory access stage 713, and the completion stage 714. Note that access pipeline also has a memory access stage 713 in parallel to the execution stage 712. Access "A" tagged instructions which are processed by the access pipeline are prioritised over the instruction execution carried out by the execute pipeline. The data processing apparatus 700 can therefore be a decoupled access-execute processor of the type described above with respect to FIGS. 1-7. The self-tagging capability thus allows such a decoupled access-execute processor to receive untagged an instruction stream and to add the tags on-the-fly.

Two storage components are shown in FIG. 12 to which the rename circuitry 704 has access. The first of these is the register write storage 720 and the second is the linked instructions storage 725. For each instruction that the rename stage 703 processes, if the instruction generates a result value stored to a register, a physical register is allocated as a destination register and a new mapping between an architectural register (specified in the instruction) and a physical register is made. The rename stage 704 also records the identity of the instruction which is responsible for writing to that physical register in an entry 721 of the register writer storage 720. Some instructions may have more than one destination register, and thus multiple mappings may be generated in the rename stage 704. Further, when a single instruction is responsible for writing to several physical registers several corresponding entries are made in the register writer storage 720. When source operand registers are renamed, the rename stage 704 consults the register writer storage 720 in order to create content for the linked instructions storage 725. Identifying an instruction which writes to the source operand register of a current instruction enables the rename stage 704 to link these "producer" instructions with the current instruction. Thus, using the information taken from the register writer storage of which instruction(s) write(s) to the source operand register(s) of a current instruction reveals one or more "producer" instructions. Thus, each entry 726 in the linked instructions storage 725 gives a list of other instructions which produce at least one data value that is consumed by that instruction.

The data processing apparatus 700 also has an instruction tagging queue 730 which is preceded by a write buffer 731. Provision of the write buffer 731 allows for potential differences in the speed with which the rename stage 704, the instruction taggers 732, and the instruction tagging queue 730 operate. When the rename stage 704 encounters the predetermined type of instruction, in this example a load instruction, it inserts an identifier for that load instruction into the write buffer 731. This is the mechanism by which the elaboration of the data dependency graph is initiated, since load instructions (in this example) are terminal nodes of the data dependency graph. Instruction taggers 732 receive instruction identifiers from the instruction tagging queue 730. In the illustrated example there are four parallel instruction taggers provided, which each receive instruction identifiers from the instruction tagging queue 730. For each instruction identifier taken from the instruction tagging queue 30 by an instruction tagger of the set of instruction taggers 732, an indication is written into the access/execute (A/E) tag cache 733, where in this example embodiment the position in the cache corresponds to the instruction identifier and a bit is written to indicate that the instruction is tagged as an access instruction. The instruction tagger also uses the current instruction identifier to look up in the linked instructions storage 725 and when a corresponding entry is found to read one or more instruction identifiers specified as producers in that entry. The instruction identifiers of these producers instructions are sent via the write buffer 731 into the instruction tagging queue 730 in order to themselves be processed.

FIG. 13A shows example content of linked instruction storage, such as the linked instruction storage 725 in the example of FIG. 12, where here this structure is referred to as a "traversal table". The content of this traversal table corresponds to the example instruction sequence set out above and for which the data dependency graphs are shown in FIGS. 8A and 8B. Thus (compared to FIG. 8A): I2 is listed as the producer instruction for instruction I3; I3 is the producer instruction for instruction I5; I5 is the producer instruction for instruction I9; and instructions I7 and I9 are the producer instructions for instruction I10. Note that instruction I10 is a load instruction and is therefore a terminal node of the data dependency graph.

FIG. 13B shows example content of register writer storage such as the register writer storage 720 of FIG. 12, which is referred to in this figure as a "last-writer table". It will be understood that the particular physical registers which are mapped to by the architectural registers specified in the instructions depends on the particular configuration of the renaming stage and the availability of physical registers when these instruction are encountered. Thus FIG. 13B is a snapshot of just one particular example content of the last-writer table. It can be seen from FIG. 13B that instruction I5 is the "last writer" for physical register 26 at the illustrated snap shot point, whilst instruction 19 is the last writer for physical register 28. Physical registers 25 and 27 are currently available to be mapped to from architectural registers and do not currently have valid "last-writer" instructions, so are marked "-".

Figures 14A, 14B:
FIGS. 14A and 14B schematically illustrate instruction tag storage and some example content in accordance with some embodiments.

FIGS. 14A and 14B show example configurations of instruction tag storage and some example content in each. In the example embodiment of FIG. 14A, the instruction tag storage is arranged to store entries which associate an instruction identifier, a tag, and a "no-process" indicator.

Thus, for any given instruction it can be determined if there is a corresponding entry in the instruction tag storage and in particular whether this instruction is tagged or not. The no process marker is used to prevent certain instructions from being placed into the instruction tagging queue. For example in the embodiment of FIG. 12 this prevents the rename stage 704 from putting the instruction into the write buffer 731 and thus loads that have already been processed by the tagging unit (which therefore do not need to trigger a new data dependency graph elaboration are marked in this way). Also, noting that an entry in the table of FIG. 14A for I20 has the no-process marker, but not the "A" tag, the no-process marker can be stored in association with some instruction which are known a priori not to be access instructions, such as branch instructions and stores without register write-back. Note that the "no-process" marker does not in fact need to be explicitly set if the "access" tag is set, since setting the access tag also prevents the instruction from being added to the instruction tagging queue.

FIG. 14B shows an alternative embodiment of instruction tag storage, where this example is referred to as an A/E cache, which may correspond to the A/E tag cache 733 of the example of FIG. 12. This is a particularly compact structure requiring only a limited amount of information to be stored, since instruction identifiers are mapped to a particular cache position and a bit is stored at a particular position indicates that an instruction which to maps to that position are marked as access instructions. A "no-process" bit can also be indicated in a similar fashion, storing a bit at a position mapped to by the subject instruction. Note that some instructions are marked as no-process, though not "access", such as the above-mentioned examples of branch instructions and stores without register write-back.

Figure 15A:
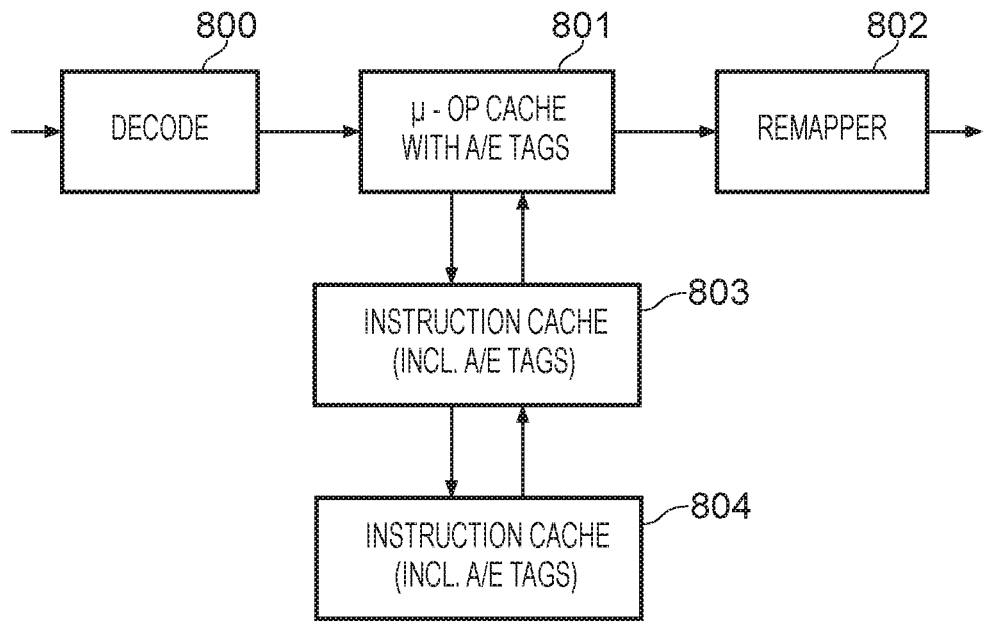
FIGS. 15A and 15B schematically illustrate an instruction cache hierarchy associated with a micro-op cache in accordance with some embodiments.
Figure 15B:
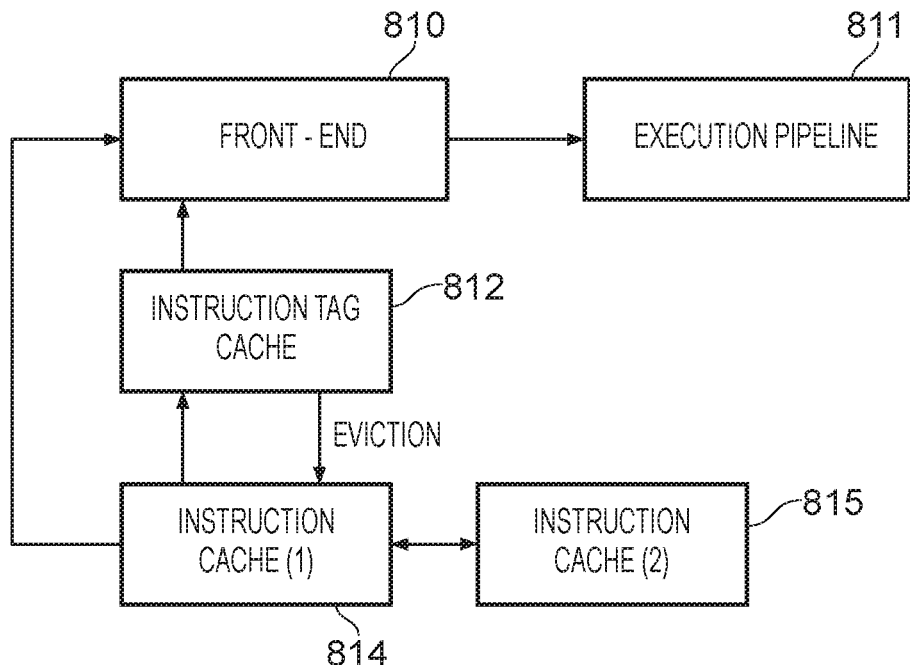

FIGS. 15A and 15B schematically illustrate configurations which allow tagging information to be evicted from the instruction tag store, yet retained for future use. In FIG. 15A an example is shown in which a decode stage 800 passes decoded instructions to a micro-op cache 801, where in this example the cache itself is provided with tagging information, and where here this is access/execute tagging information (e.g. a bit indicating whether an instruction is an access instruction or not). Instructions are taken from here by the remapper stage 802. The configuration also includes two levels of an instruction cache hierarchy 803 and 804, which are also arranged to store instruction information with associated tagging information. Accordingly, if an instruction is evicted from the micro-op cache, its associated tag information can be sent out to these further levels of the instruction cache hierarchy, meaning that this information can then be loaded back into the micro-op cache at a later point in time without having to perform the tagging process (and the data graph elaboration) once more.

FIG. 15B schematically illustrates front-end circuitry 810 preceding an execution pipeline 811 of a processor. In particular this is an embodiment in which there is no micro-op cache, but an associated instruction tag cache 812 (which receives tag information from tagging circuitry such as that described above) provides this tag information directly to the front end circuitry 810 of the processor for association with the instructions passing through. If the instruction tag cache 812 becomes full and entries are evicted, then these can be sent to further levels of instruction cache 814 and 815. When the same instruction is encountered again, the tag information can be brought into the processor along with the instruction, again saving the need to regenerate the tag information (and reiterate the data graph elaboration process).

Figure 16:
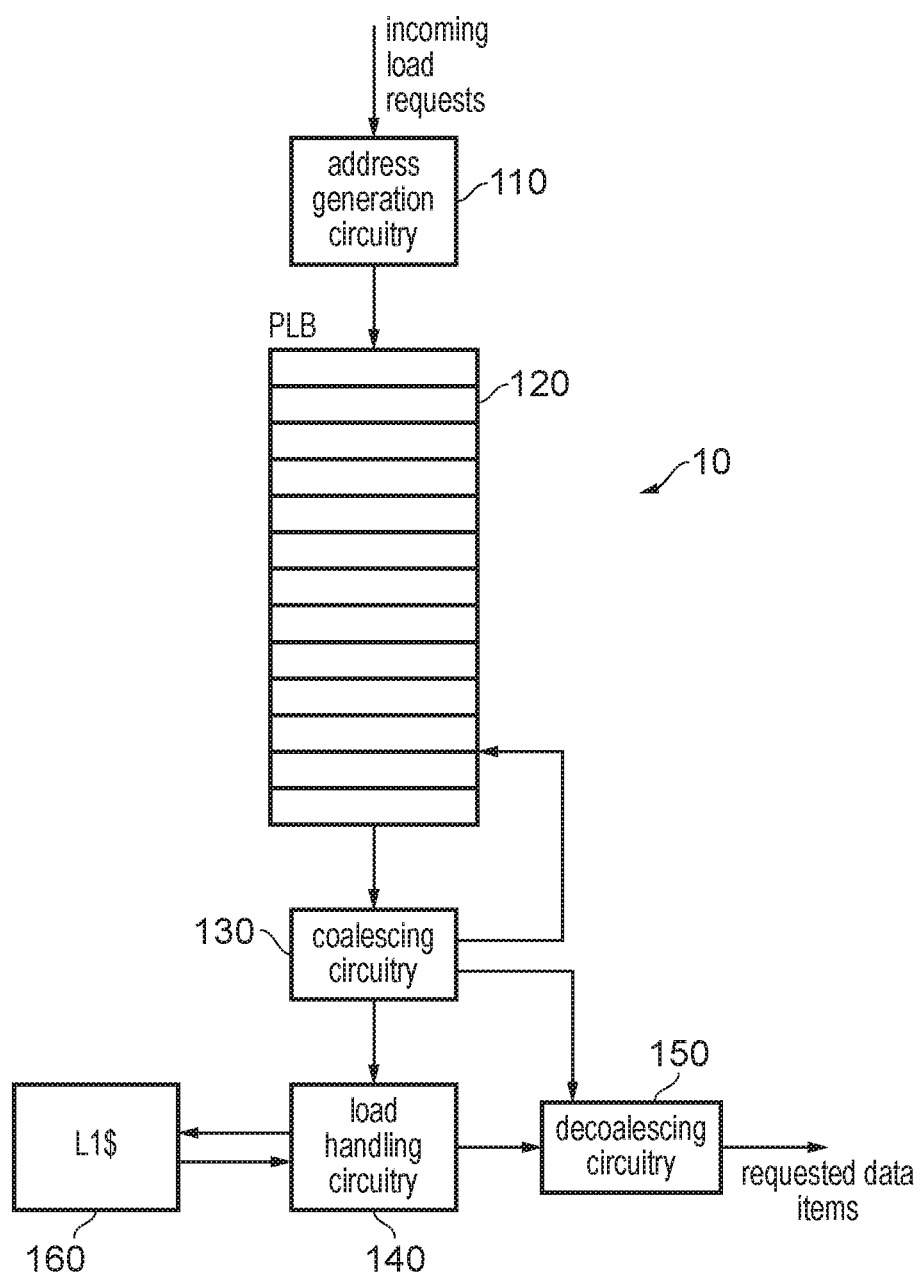
FIG. 16 schematically illustrates an apparatus in accordance with some example implementations.

FIG. 16 schematically illustrates an apparatus 10 in some embodiments. The apparatus 10 comprises various components relevant to the handling of load requests in a data processing apparatus which made for example be one of the data processing apparatuses described above with reference to FIG. 2, FIG. 4, and/or FIG. 5. As can be seen in FIG. 16 the only components illustrated here are those of relevance to the handling of load requests and the context of such apparatus will generally be understood by one of ordinary skill in the art, as well as where such load handling circuitry may be introduced into the examples of FIG. 2, FIG. 4 and/or FIG. 5. FIG. 16 shows incoming load requests being received by address generation circuitry 110, which is arranged to generate addresses required by the respective load requests. Note that the address generation circuitry may be a dedicated arrangement of circuitry for the generation of addresses or also be provided by a regular arithmetic logic unit (ALU) capable of performing integer arithmetic relating to address generation. In the latter case, in one embodiment, a decoder may split the load instruction into two separate micro-ops, one for performing the address calculation derived from the specific addressing mode used, and the other micro-op for performing the actual access specified by the "load" instruction. In such a case, once that address-generating micro-op has been executed, the "resolved" address of the "load" instruction will be written into the "pending" loads buffer (PLB) shown in FIG. 16. Note also that requests may arrive in this buffer out of program order. The load requests arrive in the pending load buffer (PLB) circuitry 120, which in this example is arranged as a FIFO buffer and accordingly in the illustration of FIG. 16 individual pending load requests may be considered to enter at the top of the PLB 120 and two track step by step through the positions illustrated to finally exit and be passed to the coalescing circuitry 130. Of course no physical movement of entries in the FIFO typically takes place, this progression of position being handled instead with reference to identifiers for each entry. In one role the coalescing circuitry 130 forwards load requests from the PLB 120 to the load handling circuitry 140, such that these load requests can be carried out and the respective data items which are their subject be retrieved from the memory system. In the illustration of FIG. 16 only the L1 cache 160 of that memory system is explicitly shown. However the coalescing circuitry 130 also plays another role in the system, namely to determine from the pending loads held in the PLB 120, if at least two pending load requests relate to memory addresses which are sufficiently close to one another that load handling efficiency may be gained by coalescing these at least two pending load requests into one. This efficient closeness of the respective memory addresses is referred to herein as being present when an "address proximity condition" is satisfied. Although it may be variously defined depending on the particular implementation of the present techniques, in the example of FIG. 16 this address proximity condition is defined with reference to the L1 cache 160, and in particular to its cache line size. In other words the coalescing circuitry 130 examines the memory addresses specified for the pending loads buffered in the PLB 120 and determines if at least two pending load requests relate to the same cache line. This being the case then those at least two pending load requests are coalesced by the coalescing circuitry 130. One part of this action by the coalescing circuitry 130 comprises suppressing the forwarding of all but one of the at least two pending load requests found to satisfy this cache line size defined "address proximity condition". The feedback path from the coalescing circuitry 130 to the PLB 120 schematically illustrates this. Further the coalescing circuitry 130 also generates a corresponding signal transmitted to the decoalescing circuitry 150. When the load handling circuitry 140 has caused the retrieval of data from the memory system (for example from the L1 cache 160), the data is passed to the decoalescing circuitry 150. By the receipt of the signal from the coalescing circuitry 130, the decoalescing circuitry 150 knows that not only should the data item specified by the load request which was carried out by the load handling circuitry 140 be passed on as one requested data item, but also that the data items specified by the at least one further pending load request (the forwarding of which to the load handling circuitry 140 was suppressed by the coalescing circuitry 130) should also be extracted and passed on as at least one further requested data item. For example, where a cache line length of data is returned from the L1 cache 160, the decoalescing circuitry 150 in this situation extracts multiple data items from that cache line to be returned.

Figure 17:
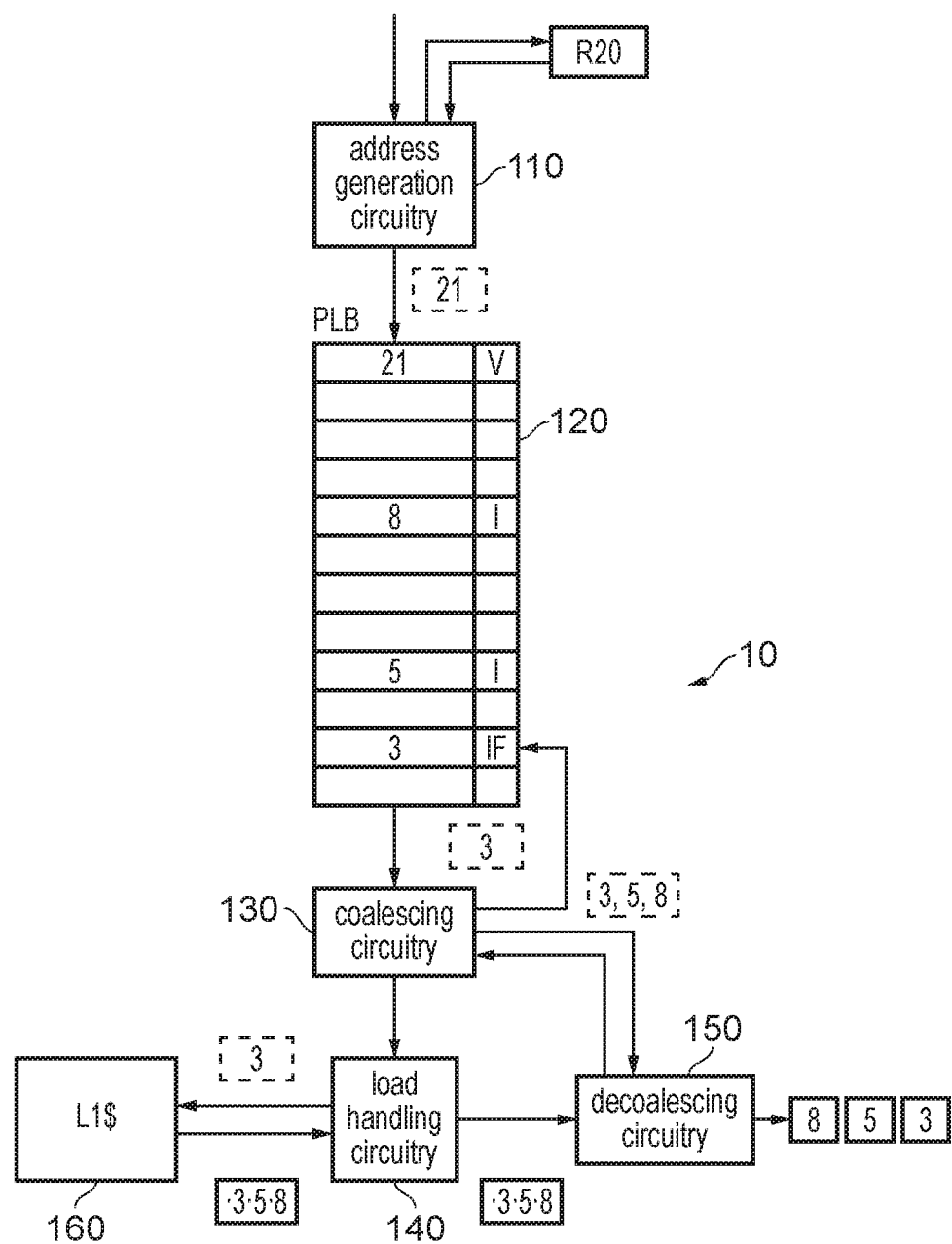
FIG. 17 schematically illustrates the apparatus of FIG. 1, further illustrating a worked operating example, in some example implementations.

FIG. 17 schematically illustrates the apparatus 10 of FIG. 16, wherein a worked example of input, processing, and output is superimposed. The address generation circuitry 110 is shown receiving a load request which identifies an architectural register R20 as holding the address from which the load should take place. Address generation circuitry 110 then determines that architectural register R20 corresponds (currently) to physical address "21" and adds the pending load with this address information to the PLB 120. The PLB 120 is a FIFO buffer structure, so this youngest pending load request is added to the first entry (uppermost in the figure). Note that the PLB 120 is generally entirely full, in that there are entries in all possible storage locations, although different statuses may be maintained for each individual entry, as will be discussed in more detail below. Also, note that only a subset of the entries in the PLB 120 in FIG. 17 are explicitly shown merely because these particular entries are of relevance to the present discussion. Thus at the snapshot moment shown for the content of PLB 120 in FIG. 17, four entries are explicitly shown, relating respectively to memory address locations 21, 8, 5, and 3. Additional information or metadata such as data access type, format, and access size information corresponding to each entry may also be stored in the pending load buffer. If required, this metadata can be shared with the decoalescing circuitry for the purpose of extracting relevant data items from the data returned from memory.

The coalescing circuitry 130 monitors the content of the PLB 120 and determine which requests will be forwarded to the load handling circuitry 140. In the course of the progression of the content of the PLB 120, the pending load request accessing address 3 becomes the oldest valid pending load request in the PLB 120 and the coalescing circuitry 130 forwards this request to the load handling circuitry 140, marking the status indicator of that entry as "in-flight" (IF). The in-flight status means that this entry in the PLB 120 for this pending load request generally then remains in the PLB 120 until the load has been handled and the requested data returned, such that the entry can then be marked as invalid. However other statuses of the entry in the PLB 120 are also used to support the present techniques. The coalescing circuitry 130 monitors and compares the memory addresses which are the subject of the respective pending load requests held in the PLB 120, in particular to identify multiple entries in the PLB 120 which relate to memory addresses which are sufficiently close to one another that "coalescing" these load requests may occur. In the example of FIG. 17 the coalescing circuitry 130 is arranged to determine if multiple pending load requests in the PLB 120 relate to memory addresses which are within the cache line size use in the memory system and in particular in the L1 cache 160. In the example snapshot shown in FIG. 17 the coalescing circuitry 130 determines that two further pending load requests in the PLB 120, namely those accessing memory addresses 5 and 8, fulfil its proximity requirement for the addresses, since the data items retrieved from memory addresses 3, 5, and 8 will be in the same cache line. Hence the coalescing circuit 130 marks the pending load requests relating to memory addresses 5 and 8 as "invalid" as well as sending an indication to the decoalesing circuitry 150 that these three pending load requests have been grouped together this manner.

Having been forwarded the pending load request relating to memory address 3, the load handling circuitry 140 accesses the memory system (including the L1 data cache 160) in order to carry out the required load. The cache line which is returned from the L1 data cache 160 comprises a number of data items including those referenced by memory addresses 3, 5, and 8. The data corresponding to the cache line is passed to (or at least accessed by) the decoalescing circuitry 150. In the absence of the signal from the coalescing circuitry 130, the decoalescing circuitry 150 would have only extracted the data item corresponding to the memory address 3, however where the decoalescing circuitry 150 has received the indication from the coalescing circuitry 130 that pending load requests relating to memory addresses 3, 5, and 8 have been coalesced, the decoalescing circuitry 150 extract the data items corresponding to all three of these memory addresses from returned data of the cache line. Receipt of the required data by the decoalescing circuitry 150 to the coalescing circuitry 130, which in response causes the entry corresponding to pending load request for the memory address 3 to be marked as invalid. Hence, when this entry reaches the head of the PLB 120 it is deleted (or at least allowed to be overwritten). Similarly when the entries corresponding to the addresses 5 and 8 reach the head of the PLB 120 they are similarly deleted (or at least allowed to be overwritten). Note that if the process of handling the coalesced load requests is interrupted, then the corresponding entries can be reinstated, with the entry corresponding to memory address 3 being changed from in-flight to valid, and the entries corresponding to memory addresses 5 and 8 being changed from invalid to valid.

Figure 18:
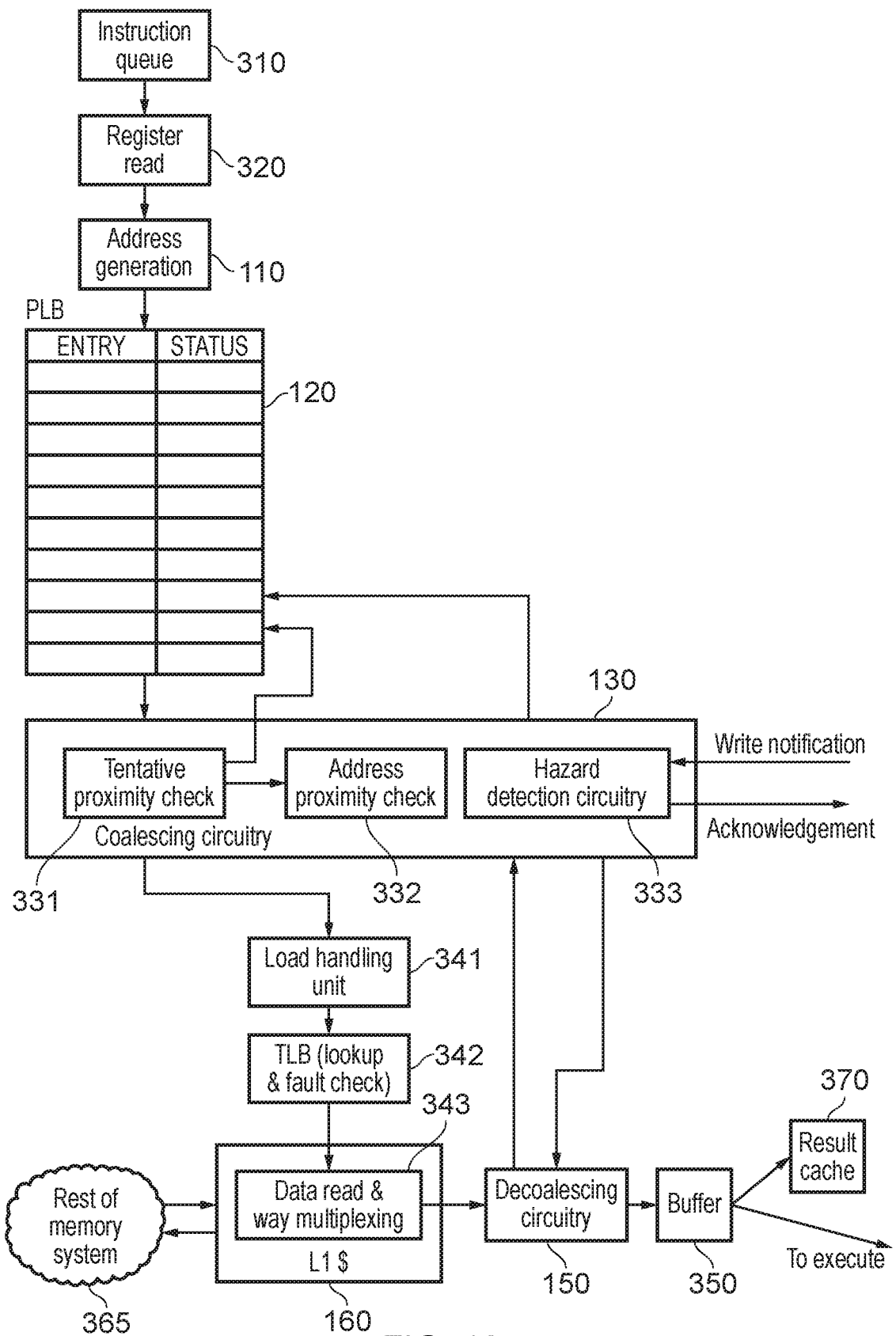
FIG. 18 schematically illustrates an apparatus in accordance with some example implementations.

FIG. 18 schematically illustrates an example embodiment which builds on the principles illustrated with respect to FIGS. 16 and 17. Various components in the apparatus of FIG. 18 have already been discussed with reference to FIGS. 16 and 17. These components are identified by the same reference numerals in FIG. 18. An instruction queue 310 is shown, feeding into register read circuitry 320, and address generation circuitry 110. Thus via this sequence load requests are identified in the instruction queue 310, the memory addresses to which they relate are determined, and a corresponding entry for each is added to the PLB 120. Further detail is shown in FIG. 18 of the coalescing circuitry 130. In the example embodiment of FIG. 18 decoalescing circuitry 130 is shown to comprise tentative proximity check circuitry 331, address proximity check circuitry 332, and hazard detection circuitry 333. The tentative proximity check circuitry 331 and the address proximity check circuitry 332 determine in a two stage process whether multiple entries in the PLB 120 relate to addresses which are close enough that their respective loads can beneficially be coalesced. Essentially the tentative proximity check is circuitry 331 performs a coarse comparison whereas the address proximity check circuitry 332 performs a more precise comparison. The coarser nature of the comparison performed by the tentative proximity check circuitry 331 enables this check to be performed more quickly and therefore the status of the corresponding entries in the PLB 120 to be more quickly (provisionally) updated. After the initial tentative proximity check is performed, which in some embodiments takes one CPU cycle (depending on the size of the PLB), "lead" pending load request (i.e. that at the head of the PLB 120) which has been compared to the pending load requests which follow it in the queue of the FIFO PLB 120, is then dispatched to the load handling unit 341, which commences the memory access. In the schematic example illustration of FIG. 18 the memory system which the load handling unit 341 accesses for this purpose comprises the TLB 342 (including look up and fault check circuitry), the L1 cache 160, and the rest of the memory system 365 (accessed in the event of an L1 miss). Whilst this access proceeds, the coalescing circuitry updates any other entries in the PLB 120 which are potential matches (i.e. pass the tentative proximity check) in a "HOLD" state and sends information identifying these candidates to the address proximity check circuitry 332, which performs a more detailed check to determine whether the remaining address bits of the potential matches are the same as that of the outgoing load being handles by the load handling unit 341. When a (close enough) match is not found by the address proximity check 332, then the coalescing circuitry causes these relevant pending load requests in the PLB 120 to be put back into the VALID state. In other words, these load requests will then proceed further through the PLB 120, being available for comparison with other load requests for address proximity and (if not squashed before they get there) to be passed to the load handling unit 241 when they reach the head of the PLB queue 120.

Conversely if a match is found by the address proximity check 332, then the coalescing circuitry causes these relevant pending load requests in the PLB 120 to be changed from HOLD to INVALID and the information about each "squashed" load is passed to the to the decoalescing circuitry 150, so that the required results from the cache can be extracted accordingly. This information can include: the load ID, its offset within the cache line; the size of the request; and the ID of the outgoing load upon which it depends. Note that despite the additional time (e.g. two CPU cycles) taken by the coalescing circuitry to perform these actions with respect to the further load requests (that are squashed in the above example), this is still less than the typical access time of the L1 cache, meaning that the latency of its operation is effectively hidden. The only case when this latency is not hidden is when the further load requests are provisionally put in the HOLD state (due to a tentative proximity match), but are then found not to be full matches by the (full) address proximity test.

Load requests issued by the load handling unit 341 access TLB 342 in order to perform the required lookup (for conversion from virtual to physical addressing) and to respond to any faults appropriately. It should be noted that various types of L1 cache may be provided for example either being virtually indexed or physically indexed, and the access to the TLB 342 may thus precede or follow the L1 cache access accordingly. When the L1 data cache access is carried out and the relevant cache line content is returned (either as a result of cache hit or by further access to the rest of the memory system 365), data read and way multiplexing circuitry 343 handles the cache line data and passes its content to (be accessible to) the decoalescing circuitry 150. The decoalescing circuitry then extracts the required data items (for coalesced load request results comprising multiple data items from one cache line). With reference to the above-described example of a decoupled access-execute processor, these data items can be placed in a buffer 350 (which can for example correspond to the decoupled access buffer 110 of FIG. 2, the decoupled access buffer 234 of FIG. 4, or the decoupled access buffer 311 of FIG. 5), from where they can also be sent to a result cache 370 and/or an "execute" portion of the full processor (such as the access result cache 236 and execute portion 220 of the example of FIG. 4).

The coalescing circuitry 331 of FIG. 18 is also schematically shown to comprise hazard detection circuitry 333, which forms part of the coherency mechanisms which this apparatus supports in the wider data processing system of which it forms part. These coherency mechanisms allow multiple master devices in the system to access and modify) data items in shared regions of memory in a manner with which one of ordinary skill in the art will generally be familiar. The hazard detection circuitry is arranged to receive write notification from an external apparatus, e.g. another master device accessing memory which is shared with this apparatus. These write notifications may for example come from snoop requests which are exchanged in a multi-master system. Thus when the coalescing circuitry passes a load request to the load handling unit 341 (for a particular cache line to be accessed), the hazard detection circuitry 333 of the coalescing circuitry tracks this access until completion and if a write notification pertaining to this cache line is received whilst it is still in-flight, the hazard detection circuitry takes remedial action. If the external apparatus is waiting for an acknowledgement signal before it proceeds to perform the write, and ordering rules define that the local load being performed should complete first, then the hazard detection circuitry delays the sending of the corresponding acknowledgement signal until after the cache line has been retrieved.

The hazard detection circuitry 333 can also take action with respect to the content of the PLB 120. For example when the ordering rules define that the access notified by the external apparatus should complete before the local load, but where the local load is already being handled by the load handing unit (either in its own right or as coalesced with at least one other load request), the hazard detection circuitry reinstates an entry in the pending load buffer circuitry. This may be achieved either by changing the entry's "in-flight" or "invalid" status back to valid, or a corresponding load request can be added to the pending load buffer. The hazard detection circuitry 333 prevents forwarding of the load request to the load handling circuitry until after the modification indicated by the write notification is known to have completed. Also the hazard detection circuitry 333 signals to the decoalescing circuitry that the relevant result of the relevant load request should not be returned.

Figure 19:
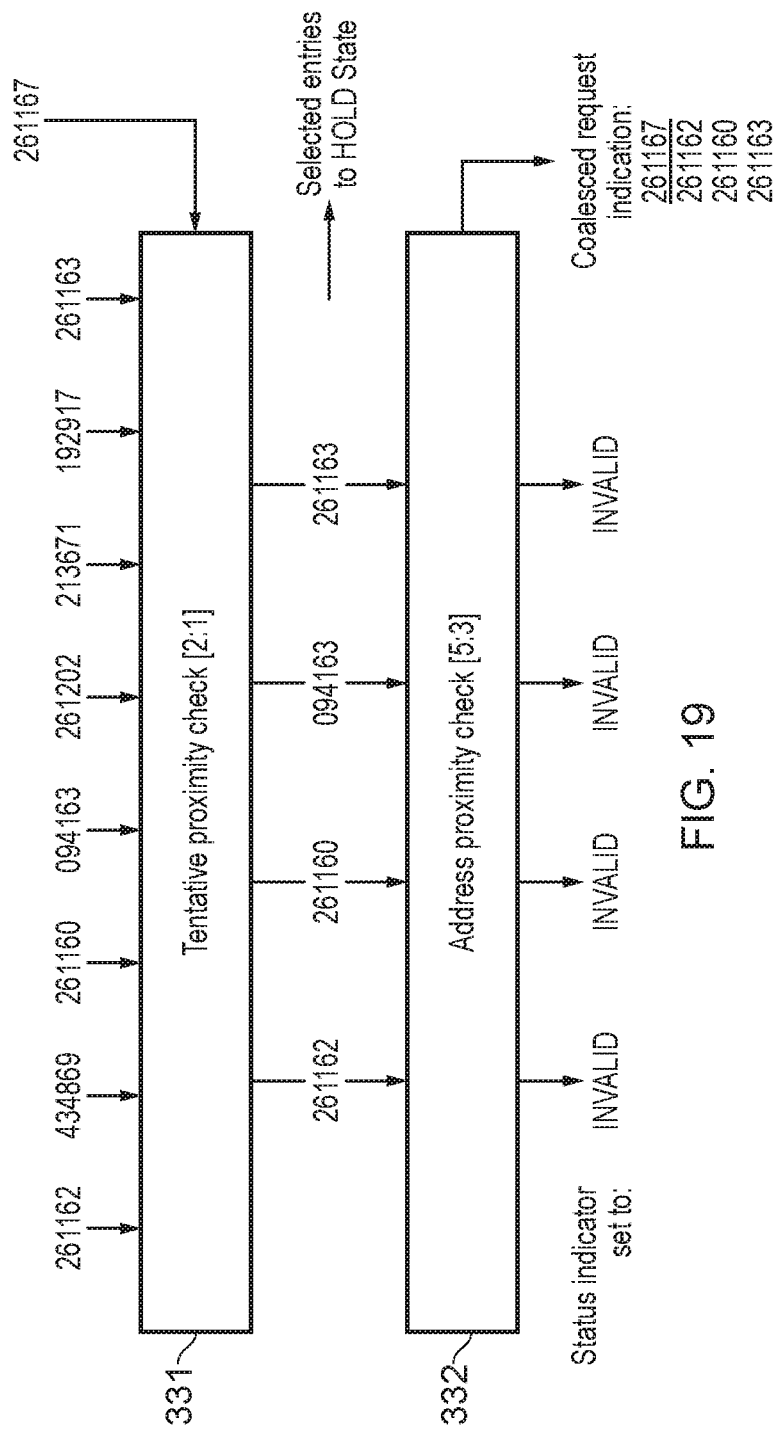
FIG. 19 schematically illustrates a worked example of a tentative proximity check and an address proximity check in accordance with some example implementations.

FIG. 19 illustrates a worked example of the two-stage address comparison checks that are performed in the coalescing circuitry of examples such as that shown in FIG. 18. Here the example hypothetical base memory address against which comparisons are being performed (i.e. corresponding to a valid, pending load request which has reached the head of the pending load buffer) is "261167". It should be noted that this example is given in decimal notation purely for the purposes of legibility here and the principle may readily be transposed into a typical binary implementation. In the first "tentative" stage 331, digits [2:1] of this address are compared with the other addresses relating to pending load requests in the PLB and hence other addresses which also have the content "16" of the digits are determined to tentatively match. The set of four addresses thus selected have the status of their pending load requests in the PLB updated to "hold". Next, in the second "full check" stage 332, digits [5:3] of the base address are compared with the other addresses relating to pending load requests in the PLB. In this example it is determined which of them also have the content "261" for these digits. Those that do not match have the status of their entries in the PLB returned to "valid". Those that do match have the status of their entries in the PLB updated to "invalid", since these will be coalesced. Accordingly in the example shown, the coalesced request indication sent to the decoalesing circuitry indicate that the base request accesses address 261167, and that the result of this request should also be used to extract the data items at addresses 261162, 261160, and 261163. It should be appreciated that this address information does not need to be explicitly communicated and instead may be communicated in a more compact form, for example with an indicator of the base load ID, and the respective offsets within the cache line.

Figure 20:
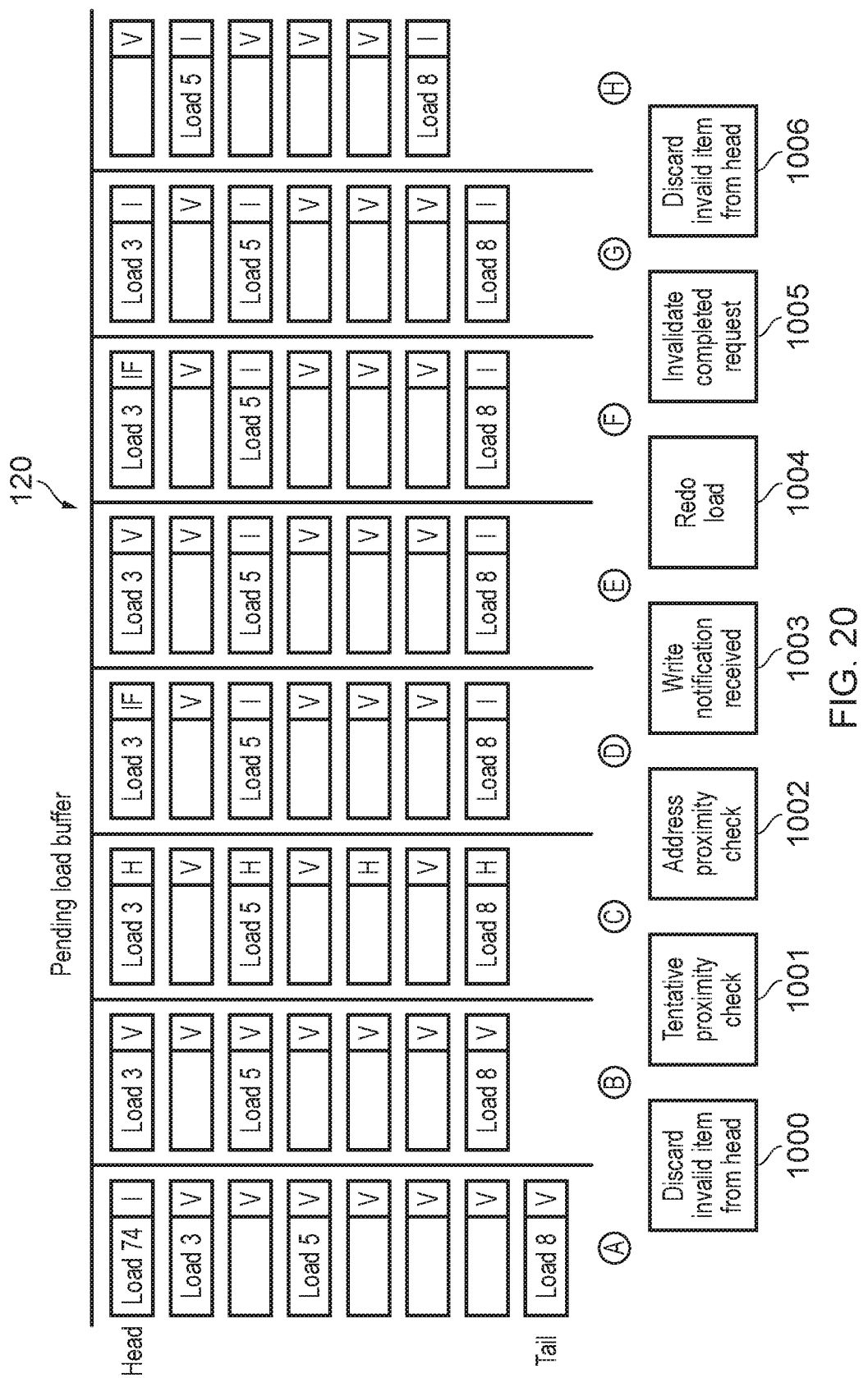
FIG. 20 schematically illustrates the content of a pending load buffer at different stages in a worked example in accordance with some example implementations.

FIG. 20 illustrates the content of a pending load buffer, as the content evolves as an example set of content is processed in accordance with some embodiments. A snapshot of the content of the pending load buffer is illustrated at eight sequential timepoints, A-H, as well as a sequence of actions 1000-1006 which are taken with respect to that content. The entries of the buffer are shown stacked vertically in the figure, with the head of the buffer (i.e. holding the oldest entry) at the top of the figure and the tail of the buffer (i.e. holding the youngest entry) at the bottom of the figure. Content A shows a load relating to address 74 having reached the head of the buffer. This entry is marked as invalid (I) and therefore action 1000 is to discard this invalid item from the head of the buffer, giving content B. Next, action 1001 performs the tentative proximity check, and as a result the head item and any items which could fully match in the address proximity check are marked "hold" (H). Note that in content C this set of pending load requests comprises the "load 3", "load 5", "load 8", and a further load in an entry midway between load 5 and load 8. This entry, all other entries in FIG. 20 other than the "load 3", "load 5", and "load 8" entries is not explicitly named merely in order to facilitate legibility. As a result of the (full) address proximity check performed as action 1002, content D remains in the pending load buffer, where the entry at the head is marked as "in-flight" (IF) (since it as it is forwarded to the load handling circuitry) and the requests for which the address proximity condition was satisfied are marked as "invalid" (I) since they have been coalesced. Note that the request in the entry midway between load 5 and load 8 was found not to match in the address proximity check and its status is reset to "valid" (V)—see content D. Next action 1003 relates to a write notification being received, which corresponds to (and supercedes) at least one of the coalesced load which was issued based on load 3, and as a result this load is squashed (any result generated in the load handling circuitry is discarded) and is reinstated in the PLB by marking it as valid again. Content E results. There is then a valid pending load request at the head of the queue and action 1004 initiates the load is again (forwarding this request to the load handling circuitry) and the entry in the PLB is marked as in-flight (content F). At this attempt "load 3" completes successfully, the results of the load request being returned from the decoalesing circuitry along with those corresponding to "load 5" and "load 8" and action 1005 then marks the "load 3" request as invalid (see content G). Finally action 1006 discards this invalid request at the head of the queue, giving content H. Note that the entries for "load 5" and "load 8" will also subsequently simply be discarded when they reach the head of the queue.

Figure 21:
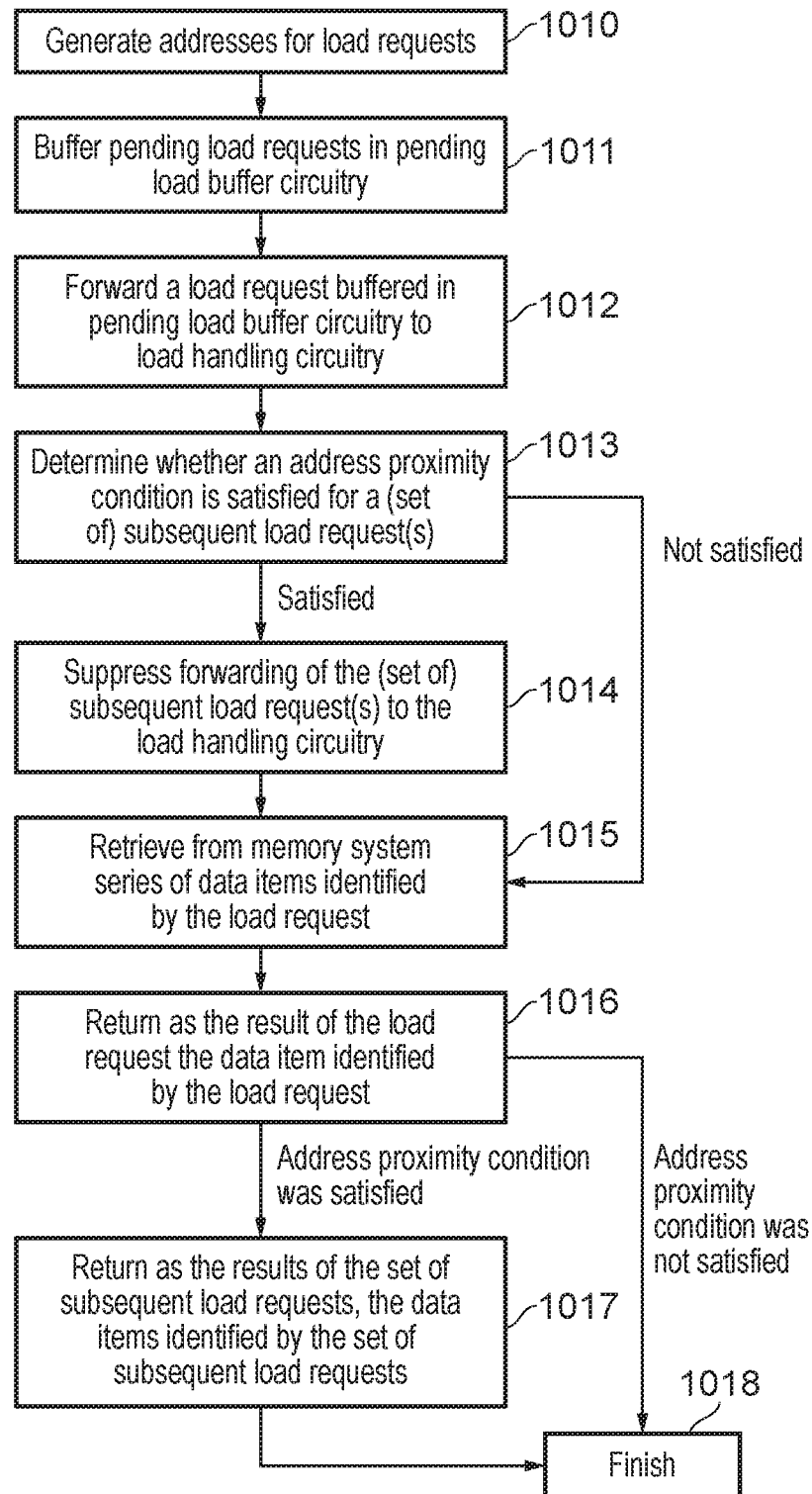
FIG. 21 is a flowchart illustrating a method of performing data processing operations in accordance with some example implementations.

FIG. 21 shows a sequence of steps which are taken according to the method of some embodiments. The sequence begins at step 1010 with the generation of addresses required for load requests. Pending load requests are buffered at step 1011 in the pending load buffer circuitry. At step 1012 a pending load request (which has reached the head of the queue formed by the pending load buffer) is forwarded to load handling circuitry to be performed. It is then determined at step 1013 whether an address proximity condition is satisfied with respect to this just issued load request for one or more subsequent load requests in the pending load buffer. When the address proximity condition is satisfied the flow proceeds to step 1014, where the forwarding to the load handling circuitry of one or more subsequent load requests satisfying that address proximity condition is suppressed. If however at step 1013 it is found that the address proximity condition is not satisfied, then the flow proceeds to step 1015. From step 1014 the flow also proceeds to step 1015. At step 1015 a set of data items identified by the forwarded load request are retrieved from the memory system. At step 1016 as a result of the load request the data item identified by the load request itself is returned. If the address proximity condition was found not to be satisfied at step 1013 then from step 1016 the flow proceeds to step 1018 where this sequence of steps finishes. If however the address proximity condition was found to be satisfied at step 1013 then from step 1016 the flow proceeds via step 1017, where in addition data items corresponding to the one or more subsequent load requests are returned. The flow then concludes at step 1018.

Figure 22:
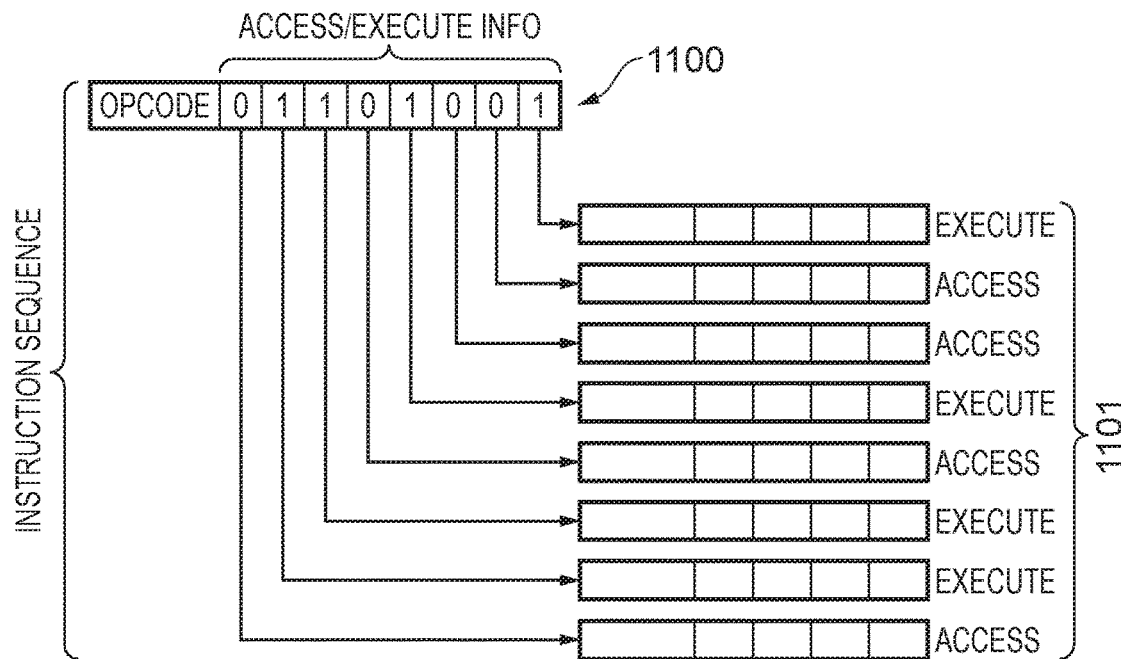
FIG. 22 schematically illustrates a sequence of instructions including a first instruction according to some embodiments which defines whether each of a set of subsequent instructions is an execute or an access instruction.

FIG. 22 illustrates an instruction sequence which comprises a steering instruction 1100 according to some embodiments and is followed by a number of further (other) instructions 1101. In accordance with the present techniques the steering instruction 1100 is provided in order to give the processor information relating to the subsequent instructions 1101, and in particular to indicate for each whether it is to be treated as an "execute" instruction or an "access" instruction. The purpose of this categorisation in the context of a decoupled access-execute processor is described above, with reference to the preceding figures showing the principles of decoupled access-execute processors (and examples thereof) according to the present techniques, discussion of the categorisation of instructions as an "execute" instruction or an "access" instruction and data dependency graph examples, and so on. In the example of FIG. 22 the steering instruction 1100 can be seen to essentially comprise two portions. A first "opcode" portion where a particular bit encoding identifies this instruction as this type of steering instruction to the decoding circuitry of the apparatus and another portion giving information relating to the categorisation (access or execute) of the set of subsequent instructions. Further, in the example of FIG. 22 it can be seen that the information in the instruction 1100 is presented explicitly, i.e. in terms of immediate values, where in this example a 0 indicates an access instruction, whilst a 1 indicates an execute instruction. Note that as mentioned above the set of instructions 1101 to which the these access/execute labels apply may immediately follow the steering instruction 1100, or (in particular for timing purposes, one or more other instructions—not shown—may be present in the instruction sequence between the steering instruction 1100 and the first of the set of instructions 1101).

Figure 23:
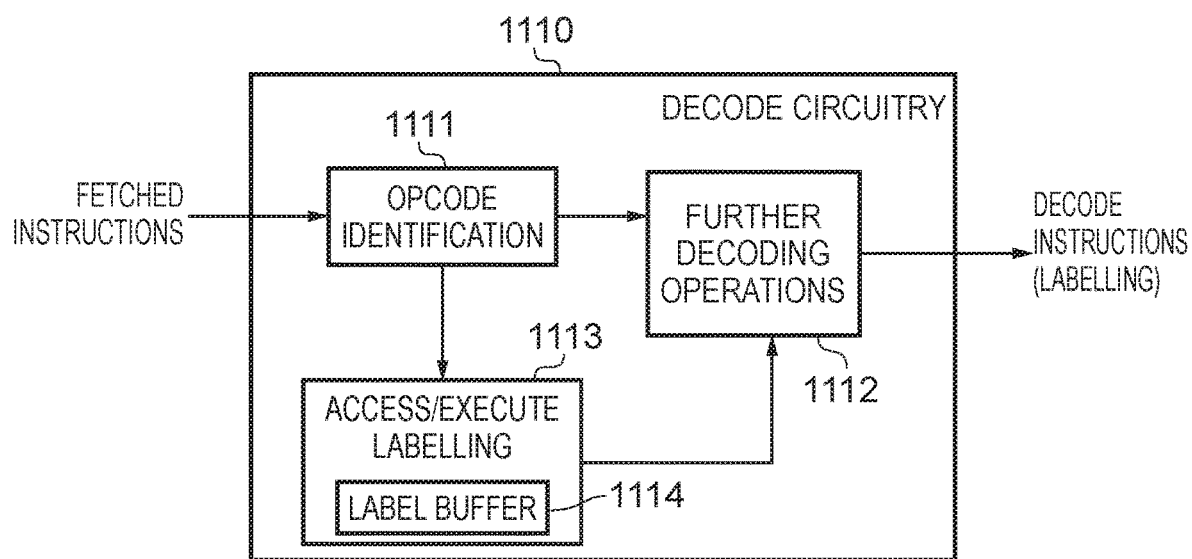
FIG. 23 schematically illustrates decoding circuitry in some embodiments.

FIG. 23 schematically illustrates decode circuitry 1110 in some embodiments. This decode circuitry may for example be the decode circuitry 102 in FIG. 2, the decode circuitry 204 in FIG. 4, the decode circuitry 302 in FIG. 5, the decode part of the circuitry 501 in FIG. 9, the decode circuitry 702 in FIG. 12, and/or the decode circuitry 800 in FIG. 15A. The decode circuitry 1110 is shown in FIG. 23 to comprise opcode identification circuitry 1111, circuitry for performing further decoding operations 1112, and access/execute labelling circuitry 1113. It will be understood by one of ordinary skill in the art that decode circuitry 1110 is only illustrated at a relatively high level of abstraction in order to communicate the points of relevance to the discussion of the present techniques. Thus many components of contemporary decode circuitry which would typically be present are not represented in the figure for clarity purposes only. The sequence of instructions, i.e. the fetched instructions, are received by the decode circuitry 1110 and the opcode identification circuitry 1111 identifies the steering instruction(s) of the present techniques by a particular opcode forming part of the instruction. When one of these instructions is identified, the opcode identification circuitry 1111 signals this to the access/execute labelling circuitry 1113, and passes the access/execute information encoded in the instruction as well. In the example embodiment of FIG. 23 the opcode identification circuitry 1111 is arranged to recognise a steering instruction of the type illustrated in the FIG. 22 and accordingly the explicit access/execute information provided as part of that instruction is then directly passed to the access/execute labelling circuitry 1113. This is stored in the label buffer 1114, which forms part of the access/execute labelling circuitry 1113. In this manner the relevant labels for the subsequent set of instructions 1101 of FIG. 22 are held by the decode circuitry 1110 and then as this sequence of subsequent instructions is received the respective labels are applied. The application of these labels is performed by the further decoding operation circuitry 1112, which receives the relevant label for each subsequent instruction. Accordingly, the output of the decode circuitry 1110 is decoded instructions labelled according to whether they are of the "access" or the "execute" type. Note that the decode circuitry 1110 is arranged to have a default labelling, which here is that the processor treats instructions as "access" by default (unless they are of a particular type, which for other reasons requires them to be forwarded to a particular part of the processor which is the only way in which these particular instruction can be executed).

Figure 24:
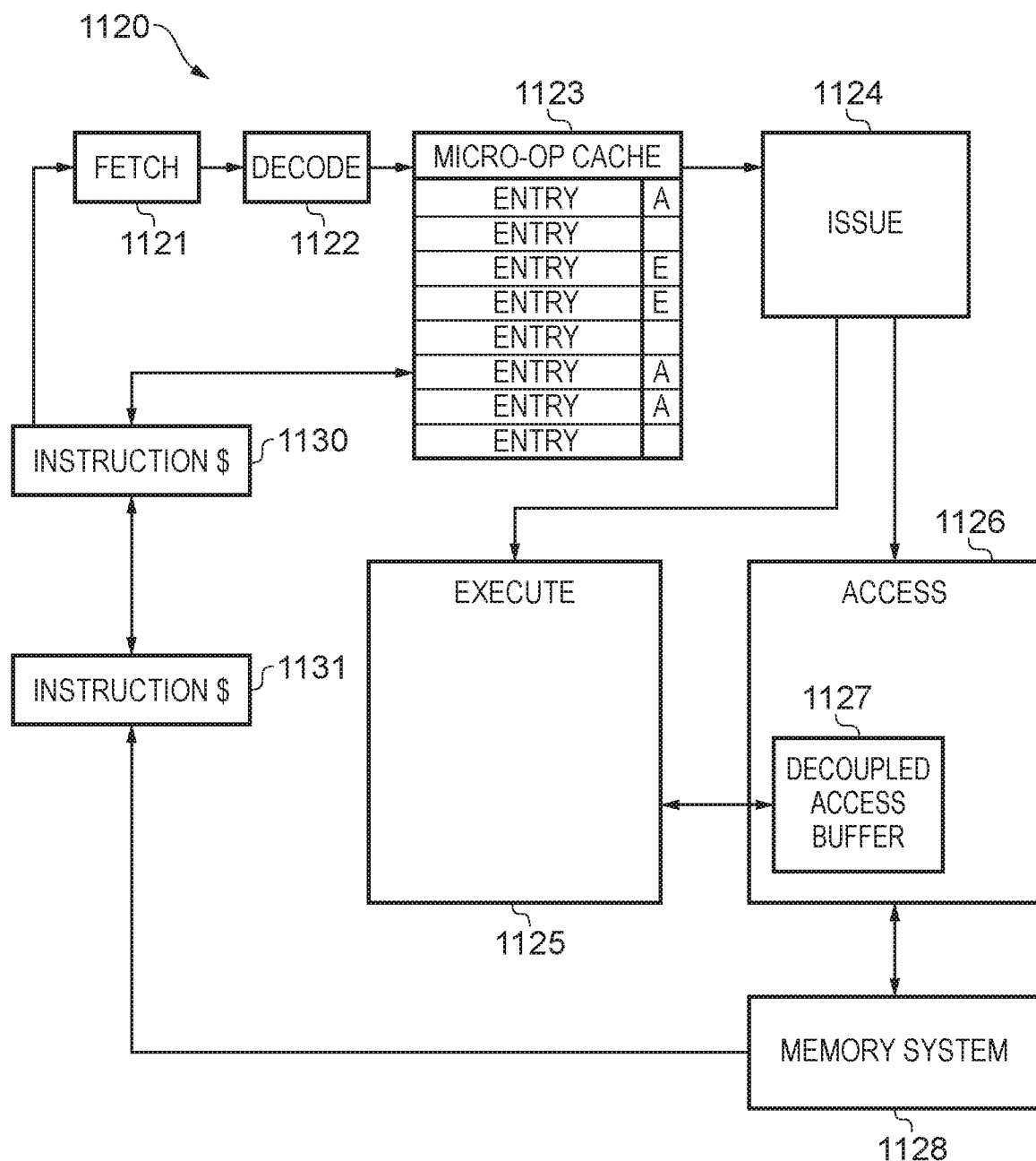
FIG. 24 schematically illustrates a data processing apparatus including a micro-op cache in some embodiments.

FIG. 24 schematically illustrates an apparatus 1120 in some example embodiments. Fetch circuitry 1121 receives instructions retrieved from the memory system and provides these to the decode circuitry 1122, which performs decoding operations, which may be generally described above with reference to FIG. 23. As shown in FIG. 24 the memory system comprises (at least) the instruction caches 1130 and 1131 to seek to avoid as often as possible the full latency associated with retrieving an instruction from its original storage location in memory. A further feature of the apparatus 1120 of FIG. 24 is the micro-op cache 1123 where micro-ops resulting from the decoding of instructions are temporarily stored. The issue circuitry 1124 retrieves instructions from the micro-op cache 1123 (if stored there) in order to issue instructions to one of the execute execution circuitry 1125 and the access execution circuitry 1126. The access execution circuitry 1126 comprises a decoupled access buffer 1127 to which the execute execution circuitry 1125 has access. The further memory system 1128 (i.e. other than the instruction caches 1130 and 1131, and for example possibly also including one or more shared caches and/or system caches before the actual memory) is also shown. It will therefore be understood that the execute execution circuitry 1125 and the access execution circuitry 1126, and the decoupled access buffer 1127 shown in FIG. 24 may be considered to be any of the examples of these components described above with reference the preceding figures.

Referring to the micro-op cache 1123 in FIG. 24, note that each entry in the micro-op cache can have an additional label associated with it (A or E) indicating whether this is to be handled as an access or an execute instruction (micro-op). The decode circuitry 1123 is arranged, on the basis of the categorisation of instructions which follow a steering instruction according to the present techniques to apply labels to the decoded instructions (and/or their equivalent micro-ops) that are stored in the micro-op cache 1123. Thus when the issue circuitry 1124 accesses entries in the micro-op cache 1123, it may also be provided with associated categorisation (label) information, and thus can direct these micro-ops to the appropriate execution circuitry 1125 or 1126 on this basis. The instruction caches 1130 and 1131 can also store the associated categorisation information (labels) applied to entries in the micro-op cache 1123, as generated by the decode circuitry 1122, and accordingly these labels can be preserved when entries are evicted from the micro-op cache to these illustrated levels (there may be more) of the instruction cache hierarchy.

Figure 25:
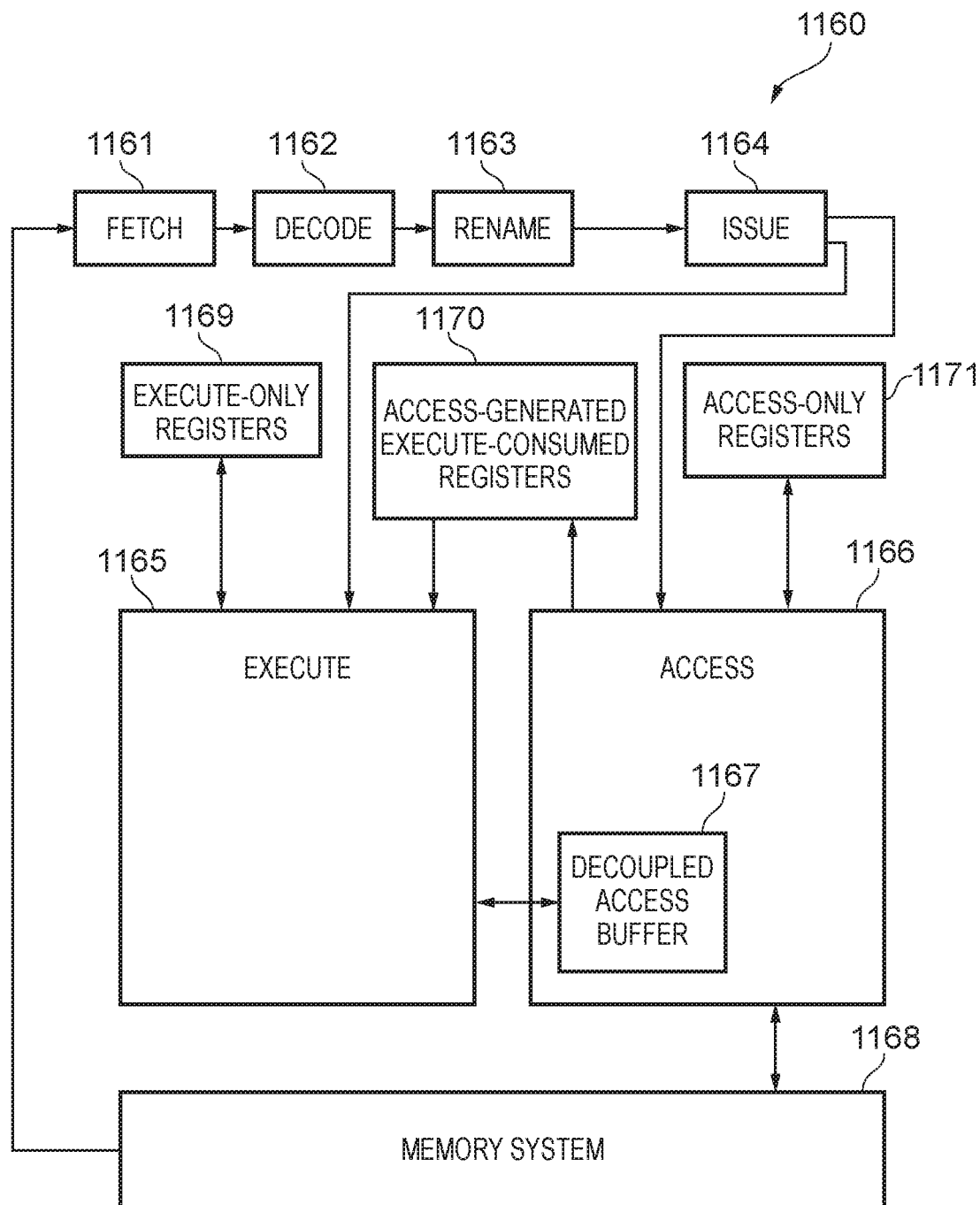
FIG. 25 schematically illustrates a data processing apparatus including groups of registers in some embodiments.

FIG. 25 schematically illustrates an apparatus 1160 in some example embodiments. Fetch circuitry 1161 receives instructions retrieved from the memory system 1168 and provides these to the decode circuitry 1162, which performs decoding operations, which may be generally described above with reference to FIG. 23. The apparatus also comprises register renaming circuitry 1163, which performs register renaming operations to allow out-of-order instruction execution. Thus remapped (renamed) instructions are passed to the issue circuitry 1164 which issues instructions to one of the execute execution circuitry 1165 and the access execution circuitry 1166. The access execution circuitry 1166 comprises a decoupled access buffer 1167 to which the execute execution circuitry 1165 has access. It will be understood that the execute execution circuitry 1165, the access execution circuitry 1166, and the decoupled access buffer 1167 shown in FIG. 25 may be considered to be any of the examples of these components described above with reference the preceding figures. FIG. 25 also shows three groups of physical registers 1169, 1170, and 1171. Although illustrated separately in FIG. 25, these are to be understood as one set of physical registers and the sub-division into the groups shown is not physical. The three subsets shown are made use of by the rename circuitry 1163 for the instructions which it processes in dependence on whether a given instruction is an "access" or an "execute" instruction. When the decode circuitry 1162 encounters a steering instruction according to the present techniques, it generates control signals to modify the renaming operations of the register renaming circuitry 1163, so that the groups of registers are used for the subsequent instructions which are "steered", in dependence on their type. Here, the registers 1171 hold values which are generated by "access" instructions and consumed only by other "access" instructions; registers 1170 hold values which are generated by "access" instructions and consumed by "execute" instructions; and registers 1169 hold values which are generated by "execute" instructions and consumed only by other "execute" instructions.

Figure 26A:
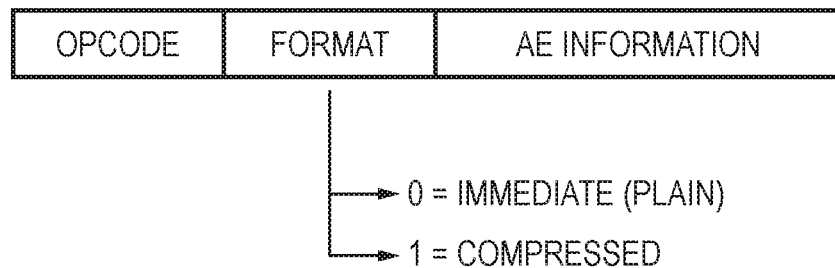
FIGS. 26A-C schematically illustrate three versions of instructions according to the present techniques in some example embodiments.
Figure 26B:
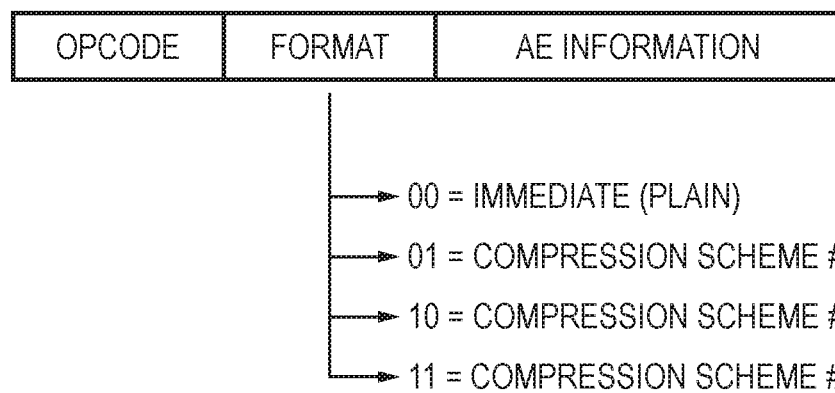
Figure 26C:
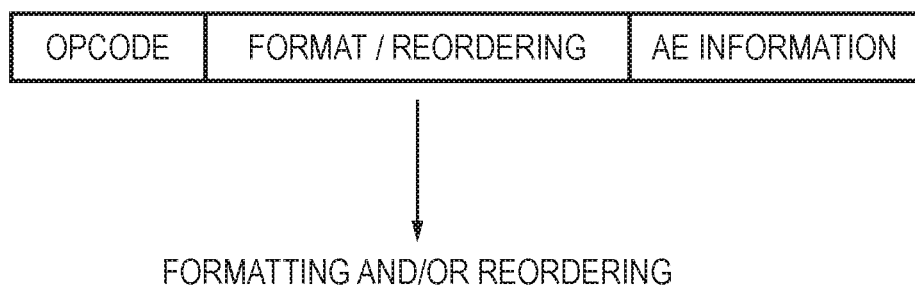

FIG. 26-C schematically illustrate the structure of steering instructions according to the present techniques in some embodiments. In FIG. 26A the instruction is shown to comprise an opcode, formatting information, and the access/execute (AE) information for one or more subsequent instructions. In the example of FIG. 26A the formatting information is binary, where a value of 0 indicates that the AE information is immediate (i.e. plain) and in the manner of FIG. 22 each bit value in the set of AE information corresponds to one subsequent instruction, indicating its type. Conversely a format value of 1 indicates that the AE information is compressed. This compression may be fixed and predetermined, so no further information is required in the instruction for the decode circuitry to interpret it (by suitably decompressing it). FIG. 26B shows an example in which the format information comprises two binary bits. As in the case of FIG. 26A a first value (here of 00) indicates that the AE information is immediate (i.e. plain), directly indicating the categorisation of the sequence of subsequent instructions. The three other possible values of the binary pair indicate which one of the three different compression schemes (#1, #2, or #3) has been used in order to encode the AE information in the instruction. In this example the compression scheme #1 (indicated by format information of 01) is run-length encoding (RLE) such that for example the pattern "AAAAAAEEEAAAAA" is (logically) presented in the AE information as {6A, 3E, 5A}. Run-length encoding (RLE) is known and not described in greater detail here—one of ordinary skill in the art can apply any known RLE procedure and representation to the AE information. In the example of FIG. 26B format information of "10" (compression scheme #2) indicates a compression scheme according to which the pattern "AAAEEAAAAAEEEEEE" is presented in the AE information as {A, 3, 2, 5, 6}. Possible compression scheme #3 is not used in example of FIG. 26B, but in fact more bits may be used in the instruction encoding (to the extent they are available) as required to indicate more compression schemes. The example of FIG. 26C shows that the instruction comprises opcode information, AE information, and format/reordering information. The format/reordering information thus indicates a compression scheme used (or not) (as in the examples of FIGS. 26A and 26B), but in addition indicates (for example by a further single binary bit) whether prior to the compression being applied (or not) a known reordering (fixed permutation) has been applied to the bits before any compression scheme has been applied. This reordering may be applied at the point when the instruction is created, or may be subsequently applied by a compiler when the compiler changes the ordering of instructions. The compiler may do this anyway for other reasons, but may explicitly do this in order to enable the grouping of access and execute instructions to lend itself to compression and thus improve the compression ratio.

Figure 27:
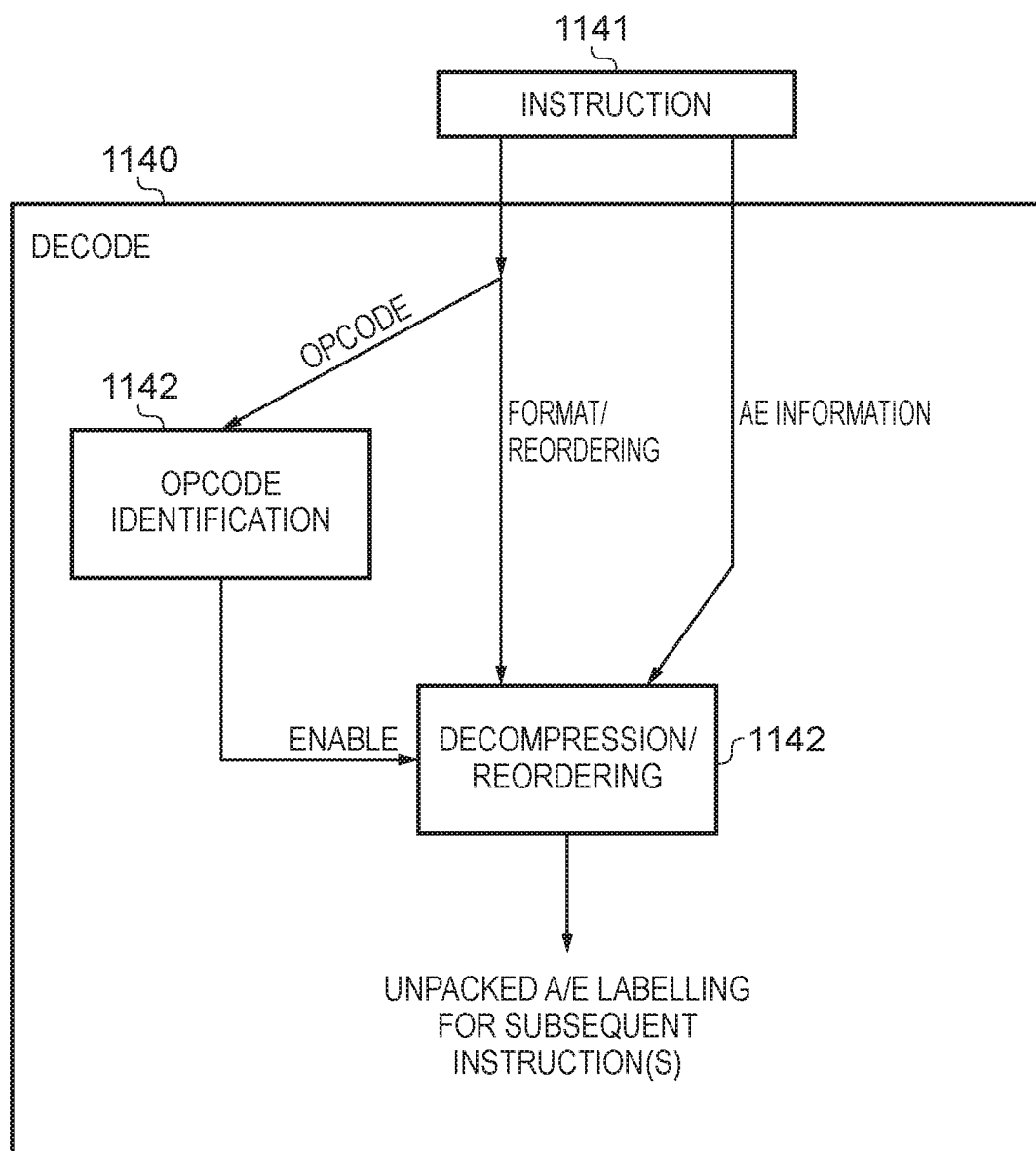
FIG. 27 schematically illustrate decoding circuitry in some embodiments.

FIG. 27 schematically illustrates decode circuitry 1140 in some embodiments. This may be the decode circuitry of any of the above described examples or figures. This figure demonstrates how instructions of one of the formats shown in FIGS. 26A-C may be received, handled, and decoded by decoding circuitry. An instruction 1141 is received by the decode circuitry 1141 and the opcode portion is routed to opcode identification circuitry 1142. The format information (and reordering information if present), as well as the AE information is routed to the decompression/reordering circuitry 1142. The opcode identification circuitry 1142 provides control information to the decompression/reordering circuitry 1142, in order that the type of instruction and in particular the nature of the formatting information (see for example the examples of FIGS. 26A-C is correctly applied in the decompression/reordering circuitry 1142). The decompression/reordering circuitry 1142 then decompresses the AE information (if required) and performs an inverse reordering (if required), in order to generate the required unpacked A/E labelling required for at least one subsequent instruction. It will be recognised that typically, for efficiency reasons, as many subsequent instructions as possible are labelled (in the available coding space) by a given steering instruction.

Figure 28:
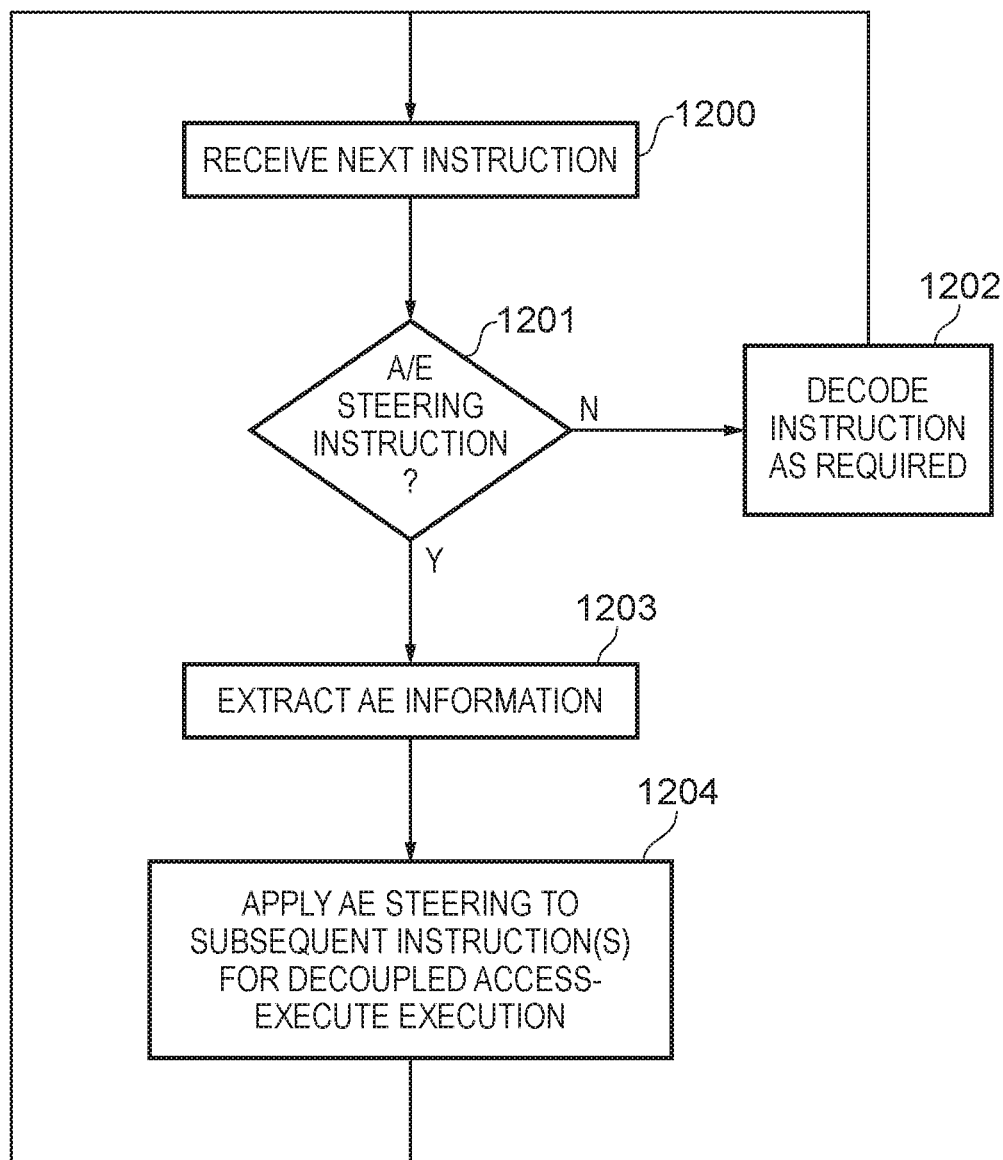
FIG. 28 is a flow diagram showing a sequence of steps taken by decoding circuitry according to some embodiments.

FIG. 28 is a flow diagram showing a sequence of steps that are taken according to the method of some embodiments by decoding circuitry. This may be the decode circuitry of any of the above described examples or figures. At step 1200 a next instruction is received by the decoding circuitry and at step 1201 it is determined if this is one of the A/E steering instructions of the present techniques. If it is not then the flow proceeds to step 1202 where the decoding circuitry decodes this instruction "normally" as required (as indeed will typically be the case for the majority of instructions received by decoding circuitry) in order for the apparatus to carry out its general data processing operations. However when an A/E steering instruction is encountered, the flow proceeds to step 1203, where the AE information is extracted from the instruction. Then at step 1204 this AE steering (i.e. the labelling or categorisation of individual instructions) is applied to the relevant subsequent instruction(s) for decoupled access-execute execution by the apparatus. Refer to any of the above described example for more detail of this decoupled access-execute execution. The flow returns to step 1200.

Figure 29:
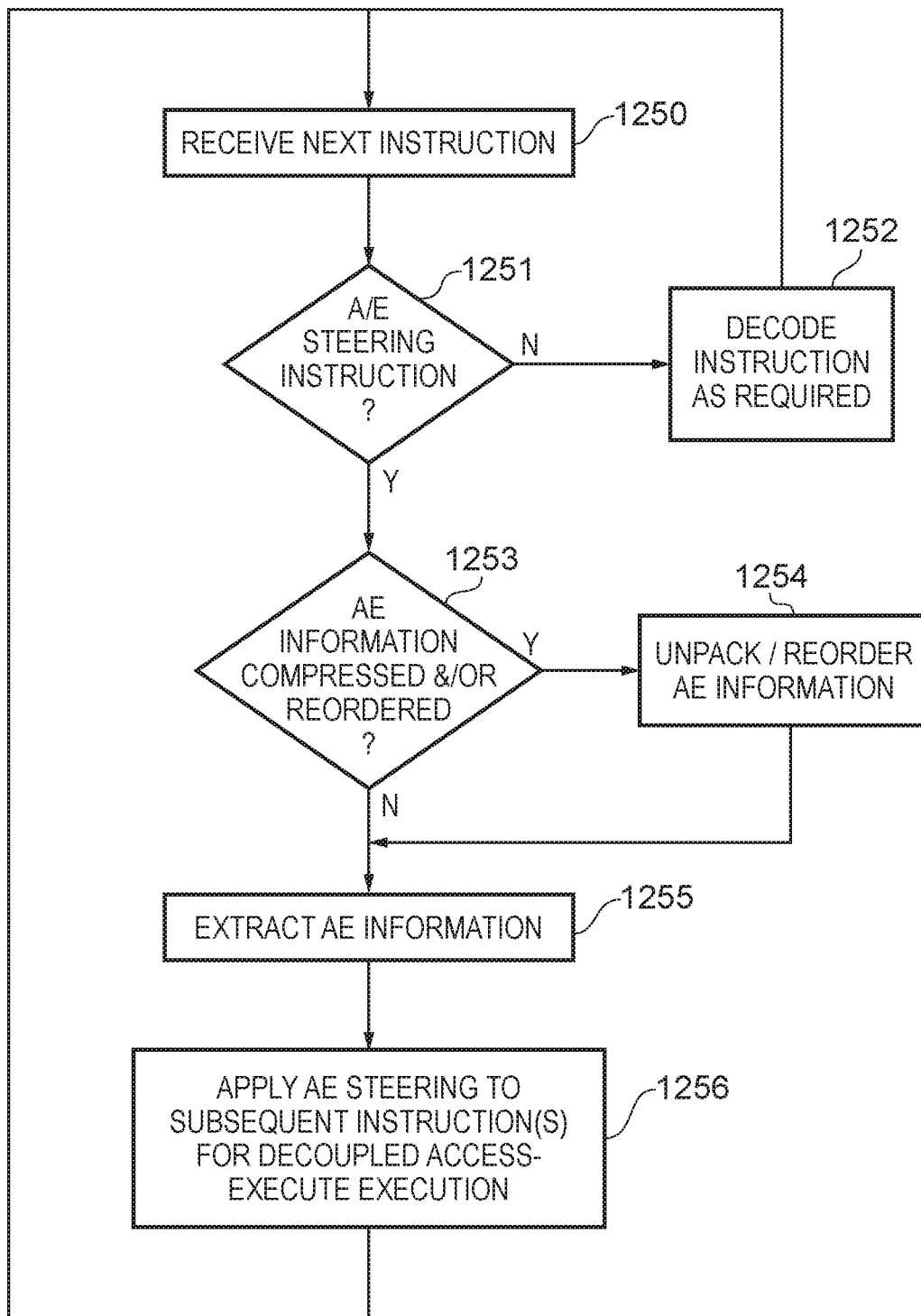
FIG. 29 is a flow diagram showing a sequence of steps taken by decoding circuitry according to some embodiments.

FIG. 29 is a flow diagram showing the sequence of steps which are taken according to the method of some embodiments by decoding circuitry, when the steering instruction(s) further comprise(s) compressed AE information. This may be the decode circuitry of any of the above described examples or figures. The flow can be considered to begin at step 1250, where the next instruction to be decoded is received by the decoding circuitry. It is then determined at step 1251 if this is an A/E steering instruction according to the present techniques and, as in the case of FIG. 28, when it is not the flow proceeds via steps 1252 in order for this instruction to be "normally" decoded and the flow returns to step 1250. In the case that an A/E steering instruction is encountered the flow proceeds to step 1253 where it is further determined if the instruction indicates that the AE information is compressed and or reordered. If it is then the flow proceeds via step 1254 in order for this AE information to be unpacked, where it will be understood that this unpacking may comprise decompression and/or reordering as was discussed above in particular with reference to FIGS. 26A-C and FIG. 27. From steps 1253 (without compression/reordering) or from step 1254 (with compression/reordering) the flow then proceeds to step 1255 for the originally plain/uncompressed/reordered AE information to be extracted. Then at step 1256 this AE steering is applied to the relevant subsequent instruction(s) for decoupled access-execute instruction. Again, refer to any of the above described example for more detail of this decoupled access-execute execution. The flow returns to step 1250.

Figure 30:
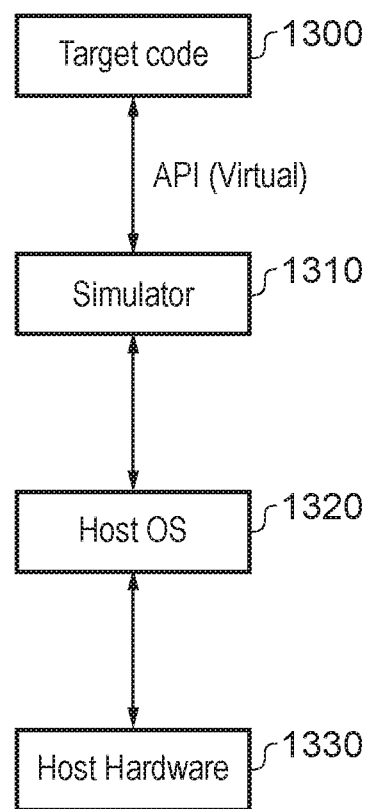
FIG. 30 schematically illustrates a simulator implementation which may be used in some embodiments.

FIG. 30 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1330, optionally running a host operating system 1320, supporting the simulator program 1310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1330), some simulated embodiments may make use of the host hardware, where suitable.

The simulator program 1310 may be stored on a computer-readable storage medium (which may be a non-transitory medium), and provides a program interface (instruction execution environment) to the target code 1300 which is the same as the application program interface of the hardware architecture being modelled by the simulator program 310. Thus, the program instructions of the target code 1300 in such embodiments comprise the above discussed novel steering instructions for providing A/E labelling and may be executed from within the instruction execution environment using the simulator program 1310, so that a host computer 1330 which does not actually have the hardware features of the apparatuses discussed above can emulate these features.

In brief overall summary apparatuses and methods of data processing are disclosed for tagging instructions on-line. Instruction tag storage stores information indicative of a tag applied to certain instruction identifiers. A data processing operation performed by the data processing circuitry in response to an executed instruction is dependent on whether there is a corresponding instruction identifier for the executed instruction in the instruction tag storage which has the instruction tag. Register writer storage is maintained, and an entry is created for each register writing instruction encountered which causes a result value to be written to a destination register, where the entry comprises an indication of the destination register and the register writing instruction. An instruction tagging queue buffers instruction identifiers and an instruction identifier is added to the queue for a predetermined type of instruction when it is encountered. Instruction tagging circuitry tags the instructions in the instruction tagging queue and determines one or more producer instructions which each produce at least one data value which is a source operand of a subject instruction and adds the one or more producer instructions to the instruction tagging queue. Data dependency graphs are thus elaborated and online tagging of such data dependency graphs is thus supported.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
   data processing circuitry responsive to received instructions to perform data processing operations;
   instruction tag storage to store entries comprising instruction identifiers, wherein an instruction tag is selectively stored in association with each instruction identifier, and wherein a data processing operation performed by the data processing circuitry in response to an executed instruction is dependent on whether there is a corresponding instruction identifier for the executed instruction in the instruction tag storage which has the instruction tag;
   register writer storage;
   register mapping circuitry arranged to create an entry in the register writer storage for each register writing instruction in the received instructions which causes a result value to be written to a destination register, wherein the entry comprises an indication of the destination register and a register writing instruction identifier;
   an instruction tagging queue to buffer instruction identifiers, wherein the register mapping circuitry is responsive to encountering an instruction instance of a predetermined type of instruction in the received instructions to add to the instruction tagging queue an instruction identifier for the instruction instance of the predetermined type of instruction;
   instruction tagging circuitry to receive from the instruction tagging queue the instruction identifiers and for each instruction identifier to perform tag processing comprising:
      creating an entry in the instruction tag storage and storing the instruction tag in association therewith; and
      for a subject instruction identified by the instruction identifier determining one or more producer instructions which each produce at least one data value which is a source operand of the subject instruction and adding the one or more producer instructions to the instruction tagging queue;
wherein the predetermined type of instruction in the received instructions is a load instruction and the data processing circuitry comprises:
a first execution pipeline to perform first data processing operations; and
a second execution pipeline to perform second data processing operations,
wherein the data processing operation performed by the data processing circuitry in response to the executed instruction takes place in the first execution pipeline when there is the corresponding instruction identifier for the executed instruction in the instruction tag storage which has the instruction tag,
wherein the data processing operation performed by the data processing circuitry in response to the executed instruction takes place in the second execution pipeline when there is not the corresponding instruction identifier for the executed instruction in the instruction tag storage which has the instruction tag, and
wherein the apparatus is arranged to prioritize data processing operations by the first execution pipeline over data processing operations by the second execution pipeline.

2. The apparatus as claimed in claim 1, wherein the instruction tagging circuitry is arranged to determine the one or more producer instructions for the subject instruction identified by the instruction identifier with reference to the register writer storage.

3. The apparatus as claimed in claim 1, further comprising:
linked instruction storage to store entries, each entry comprising identifiers of an entry instruction and of one or more producer instructions, wherein the one or more producer instructions each produce at least one data value which is a source operand of the entry instruction,
and wherein the instruction tagging circuitry is arranged to determine the one or more producer instructions for the subject instruction identified by the instruction identifier with reference to the linked instruction storage.

4. The apparatus as claimed in claim 1, wherein the data processing circuitry is arranged to perform out-of-order instruction execution in response to the received instructions and the register mapping circuitry is arranged to perform register renaming comprising mapping architectural registers specified in the received instructions to physical registers,
and wherein the entries in the register writer storage comprises indications of destination physical registers and register writing instruction identifiers.

5. The apparatus as claimed in claim 1, further comprising:
linked instruction storage to store entries, each entry comprising identifiers of an entry instruction and of one or more producer instructions, wherein the one or more producer instructions each produce at least one data value which is a source operand of the entry instruction,
wherein the instruction tagging circuitry is arranged to determine the one or more producer instructions for the subject instruction identified by the instruction identifier with reference to the linked instruction storage,
wherein the data processing circuitry is arranged to perform out-of-order instruction execution in response to the received instructions and the register mapping circuitry is arranged to perform register renaming comprising mapping architectural registers specified in the received instructions to physical registers,
wherein the entries in the register writer storage comprises indications of destination physical registers and register writing instruction identifiers,
and wherein, when the register mapping circuitry performs register renaming with respect to source operands of an instruction, the register mapping circuitry is arranged to use content of the register writer storage to create an entry in the linked instruction storage.

6. The apparatus as claimed in claim 1, wherein the data processing circuitry is arranged to perform in-order instruction execution in response to the received instructions and wherein the entries in the register writer storage comprises indications of destination architectural registers and register writing instruction identifiers.

7. The apparatus as claimed in claim 1, wherein the instruction tagging circuitry comprises a plurality of instruction tagging engines arranged to perform the tag processing in parallel.

8. The apparatus as claimed in claim 1, wherein the instruction tagging queue comprises a preceding write buffer arranged to feed the instruction tagging queue, and wherein an addition to the instruction tagging queue is performed by writing to the preceding write buffer.

9. The apparatus as claimed in claim 1, further comprising an instruction-information cache to cache information related to the received instructions for provision to the data processing circuitry, wherein the instruction tag storage is provided in association with the instruction-information cache.

10. The apparatus as claimed in claim 9, wherein the instruction-information cache is a micro-op cache.

11. The apparatus as claimed in claim 9, further comprising an instruction-information cache hierarchy, wherein the instruction-information cache hierarchy comprises the instruction-information cache,
and wherein eviction of an entry from the instruction-information cache causes eviction of a corresponding entry from the instruction tag storage.

12. The apparatus as claimed in claim 11, wherein a further cache level of the instruction-information cache hierarchy is arranged to store entries comprising the instruction identifiers with associated instruction tags,
and wherein the instruction-information cache hierarchy is responsive to a received instruction having an entry in the further cache level of the instruction-information cache hierarchy and having no entry in the instruction tag storage to cause the entry in the further cache level of the instruction-information cache hierarchy to be brought into the instruction tag storage.

13. The apparatus as claimed in claim 1, wherein the instruction tagging circuitry is responsive to reception of an instruction identifier of the predetermined type of instruction from the instruction tagging queue to store a no-process marker in association with the instruction identifier of the predetermined type of instruction,
wherein the register mapping circuitry is responsive to the no-process marker when encountering the instruction instance of the predetermined type of instruction in the received instructions to suppress addition to the instruction tagging queue of the instruction identifier for the instruction instance of the predetermined type of instruction.

14. The apparatus as claimed in claim 13, further comprising an instruction-information cache to cache information related to the received instructions for provision to the data processing circuitry, wherein the instruction tag storage is provided in association with the instruction-information cache, and wherein the instruction tagging circuitry is arranged to store the no-process marker in association with the instruction identifier of the predetermined type of instruction in the instruction-information cache.

15. The apparatus as claimed in claim 1, wherein the instruction tagging circuitry is responsive to a lack of instruction identifiers in the instruction tagging queue to enter a low power state.

16. The apparatus as claimed in claim 1, where the instruction identifiers in the instruction tag storage comprise positions in the instruction tag storage, and wherein storage of the instruction tag in association with the instructions identifier comprises storing a predetermined marker at a position in the instruction tag storage which corresponds to the instruction identifier.

17. A method of operating an apparatus, the method comprising:
performing data processing operations in response to received instructions;
storing entries in an instruction tag storage comprising instruction identifiers, wherein an instruction tag is selectively stored in association with each instruction identifier, and wherein a data processing operation performed in response to an executed instruction is dependent on whether there is a corresponding instruction identifier for the executed instruction in the instruction tag storage which has the instruction tag;
creating an entry in a register writer storage for each register writing instruction in the received instructions which causes a result value to be written to a destination register, wherein the entry comprises an indication of the destination register and a register writing instruction identifier;
buffering instruction identifiers in an instruction tagging queue, wherein in response to encountering an instruction instance of a predetermined type of instruction in the received instructions an instruction identifier is added to the instruction tagging queue for the instruction instance of the predetermined type of instruction;
receiving from the instruction tagging queue the instruction identifiers and for each instruction identifier performing tag processing comprising:
creating an entry in the instruction tag storage and storing the instruction tag in association therewith; and
for a subject instruction identified by the instruction identifier determining one or more producer instructions which each produce at least one data value which is a source operand of the subject instruction and adding the one or more producer instructions to the instruction tagging queue;
wherein the predetermined type of instruction in the received instructions is a load instruction,
the method further comprising:
in response to the executed instruction, performing the data processing operation in a first execution pipeline when there is the corresponding instruction identifier for the executed instruction in the instruction tag storage which has the instruction tag;
in response to the executed instruction, performing in a second execution pipeline when there is not the corresponding instruction identifier for the executed instruction in the instruction tag storage which has the instruction tag; and
prioritizing data processing operations by the first execution pipeline over data processing operations by the second execution pipeline.

18. An apparatus comprising:
means for performing data processing operations in response to received instructions;
means for storing instruction tag entries comprising instruction identifiers, wherein an instruction tag is selectively stored in association with each instruction identifier, and wherein a data processing operation performed by the means for performing data processing operations in response to an executed instruction is dependent on whether there is a corresponding instruction identifier for the executed instruction in the means for storing instruction tag entries which has the instruction tag;
means for storing register writer information;
means for creating an entry in the means for storing register writer information for each register writing instruction in the received instructions which causes a result value to be written to a destination register, wherein the entry comprises an indication of the destination register and a register writing instruction identifier;
means for queuing instruction identifiers for instruction tagging, wherein in response to encountering an instruction instance of a predetermined type of instruction in the received instructions an instruction identifier is added to the means for queuing instruction identifiers for instruction tagging for the instruction instance of the predetermined type of instruction; and
means for receiving from the means for queuing instruction identifiers for instruction tagging the instruction identifiers and means for performing, for each instruction identifier, tag processing, the means for performing tag processing comprising:
means for creating an entry in the means for storing instruction tag entries and for storing the instruction tag in association therewith;
means for determining, for a subject instruction identified by the instruction identifier, one or more producer instructions which each produce at least one data value which is a source operand of the subject instruction;
means for adding the one or more producer instructions to the means for queuing instruction identifiers for instruction tagging;
wherein the predetermined type of instruction in the received instructions is a load instruction and the means for performing data processing operations comprises:
a first execution pipeline to perform first data processing operations; and
a second execution pipeline to perform second data processing operations,
wherein the data processing operation performed by the means for performing data processing operations in response to the executed instruction takes place in the first execution pipeline when there is the corresponding instruction identifier for the executed instruction in the means for storing instruction tag entries which has the instruction tag,
wherein the data processing operation performed by the means for performing data processing operations in response to the executed instruction takes place in the second execution pipeline when there is not the corresponding instruction identifier for the executed instruction in the means for storing instruction tag entries which has the instruction tag, and wherein the apparatus is arranged to prioritize data processing operations by the first execution pipeline over data processing operations by the second execution pipeline.

* * * * *